US012077642B2

(12) United States Patent
Bertino et al.

(10) Patent No.: US 12,077,642 B2
(45) Date of Patent: Sep. 3, 2024

(54) POLYMERIC AEROGEL COMPOSITE AND SYNTHESIS BY AMBIENT AND FREEZE-DRYING

(71) Applicant: VIRGINIA COMMONWEALTH UNIVERSITY, Richmond, VA (US)

(72) Inventors: Massimo Bertino, Glen Allen, VA (US); Sylwia Czlonka, Richmond, VA (US)

(73) Assignee: VIRGINIA COMMONWEALTH UNIVERSITY, Richmond, VA (US)

( * ) Notice: Subject to any disclaimer, the term of this patent is extended or adjusted under 35 U.S.C. 154(b) by 394 days.

(21) Appl. No.: 17/059,804

(22) PCT Filed: May 31, 2019

(86) PCT No.: PCT/US2019/034797
§ 371 (c)(1),
(2) Date: Nov. 30, 2020

(87) PCT Pub. No.: WO2019/232297
PCT Pub. Date: Dec. 5, 2019

(65) Prior Publication Data
US 2021/0206926 A1    Jul. 8, 2021

Related U.S. Application Data

(60) Provisional application No. 62/679,254, filed on Jun. 1, 2018.

(51) Int. Cl.
*C08J 9/28* (2006.01)
*B29C 48/00* (2019.01)
(Continued)

(52) U.S. Cl.
CPC ............. *C08J 5/045* (2013.01); *B29C 48/022* (2019.02); *B33Y 70/00* (2014.12); *C08G 8/22* (2013.01);
(Continued)

(58) Field of Classification Search
CPC ........ C08J 5/045; C08J 9/0061; C08J 9/0085; C08J 9/0095; C08J 9/28; C08J 9/35;
(Continued)

(56) References Cited

U.S. PATENT DOCUMENTS 4,317,765 A  *  3/1982  Gaylord ................... C08K 9/08
                                                                524/427
5,942,553 A      8/1999  Biesmans et al.
(Continued)

FOREIGN PATENT DOCUMENTS

WO     2018/078512 A1    5/2018

OTHER PUBLICATIONS

Czlonka et al.; "Freeze-drying method as a new approach to the synthesis of polyurea aerogels from isocyanate and water"; Journal of Sol-Gel Science and Technology, vol. 87, No. 3, Sep. 2018, pp. 685-695.

*Primary Examiner* — K. Boyle
(74) *Attorney, Agent, or Firm* — WCF IP

(57) ABSTRACT

Polymeric aerogels, articles made from the polymeric aerogels and methods of making the polymeric aerogels are provided. The aerogels are made e.g. from crosslinkable monomers such as isocyanate monomers or phenolic monomers and a filler comprising crosslinkable hydroxyl groups. The filler may be natural (e.g. wood flour) or synthetic. The aerogels and products made therefrom exhibit low thermal conductivity and are mechanically strong. Due to their physical properties, these materials are used as e.g. building envelope components, such as walls, roofs and frames, to (Continued)

improve the thermal performance thereof, and may be used in a variety of other applications such as sound and insulation barriers in mechanical equipment, cryogenic containers, etc.

5 Claims, 12 Drawing Sheets

(51) Int. Cl.
| | |
|---|---|
| B33Y 70/00 | (2020.01) |
| C08G 8/22 | (2006.01) |
| C08G 18/18 | (2006.01) |
| C08G 18/30 | (2006.01) |
| C08G 18/64 | (2006.01) |
| C08G 18/79 | (2006.01) |
| C08J 5/04 | (2006.01) |
| C08J 9/00 | (2006.01) |
| C08J 9/35 | (2006.01) |
| C08L 61/12 | (2006.01) |
| C08L 75/02 | (2006.01) |
| B29K 75/00 | (2006.01) |
| B29K 105/00 | (2006.01) |
| B29K 105/16 | (2006.01) |
| B29K 401/00 | (2006.01) |
| B29K 477/00 | (2006.01) |
| B29K 511/10 | (2006.01) |

(52) U.S. Cl.
CPC ............ *C08G 18/18* (2013.01); *C08G 18/305* (2013.01); *C08G 18/6492* (2013.01); *C08G 18/792* (2013.01); *C08J 9/0061* (2013.01); *C08J 9/0085* (2013.01); *C08J 9/0095* (2013.01); *C08J 9/28* (2013.01); *C08J 9/35* (2013.01); *C08L 61/12* (2013.01); *C08L 75/02* (2013.01); *B29K 2075/00* (2013.01); *B29K 2105/0061* (2013.01); *B29K 2105/16* (2013.01); *B29K 2401/00* (2013.01); *B29K 2477/10* (2013.01); *B29K 2511/10* (2013.01); *C08G 2110/0066* (2021.01); *C08G 2110/0083* (2021.01); *C08G 2110/0091* (2021.01); *C08J 2205/026* (2013.01); *C08J 2361/10* (2013.01); *C08J 2375/02* (2013.01); *C08J 2375/04* (2013.01); *C08J 2401/02* (2013.01); *C08J 2497/02* (2013.01)

(58) Field of Classification Search
CPC ............ C08J 2205/026; C08J 2361/10; C08J 2375/02; C08J 2375/04; C08J 2401/02; C08J 2497/02; C08J 2401/00; B29C 48/022; B33Y 70/00; C08G 18/18; C08G 18/305; C08G 18/6492; C08G 18/792; C08G 2110/0066; C08G 2110/0083; C08G 2110/0091; C08L 61/12; C08L 75/02; B29K 2075/00; B29K 2105/0061; B29K 2105/16; B29K 2401/00; B29K 2477/20; B29K 2511/10
See application file for complete search history.

(56) References Cited

U.S. PATENT DOCUMENTS

| | | |
|---|---|---|
| 6,143,400 A | 11/2000 | Schwertfeger et al. |
| 9,550,871 B2* | 1/2017 | Gong .................... C08J 9/0061 |
| 2007/0259979 A1 | 11/2007 | Lee |
| 2012/0152846 A1 | 6/2012 | Leventis et al. |
| 2014/0134415 A1 | 5/2014 | Gong et al. |
| 2018/0015436 A1* | 1/2018 | Chandrasekaran .... B33Y 10/00 |

* cited by examiner

Figure 4A  Figure 4C  Figure 4E
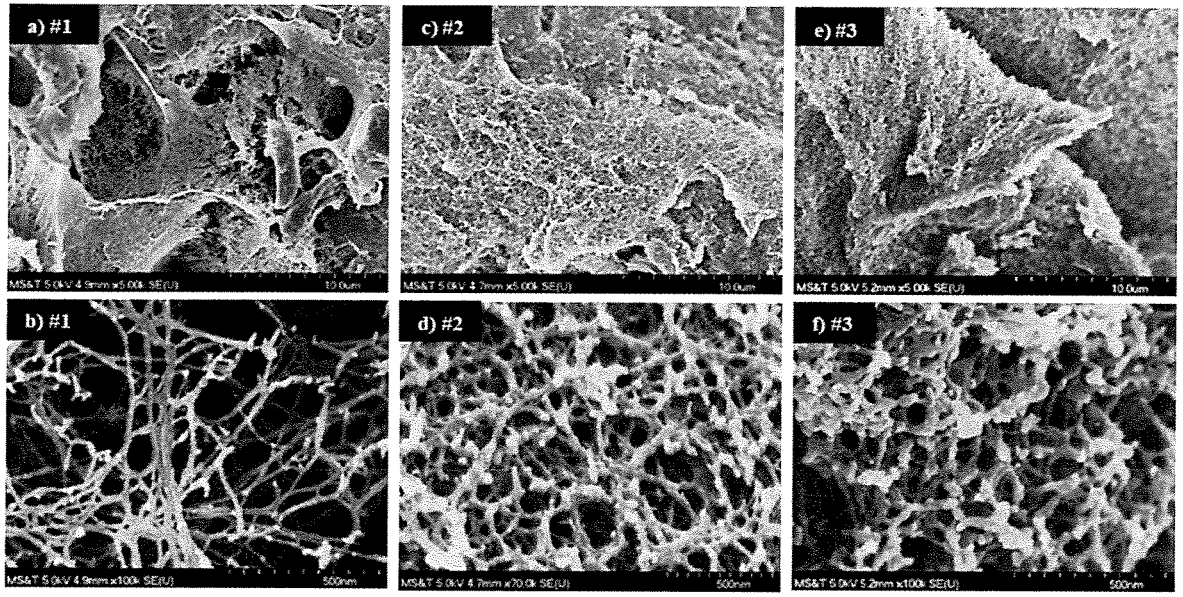
Figure 4B  Figure 4D  Figure 4F
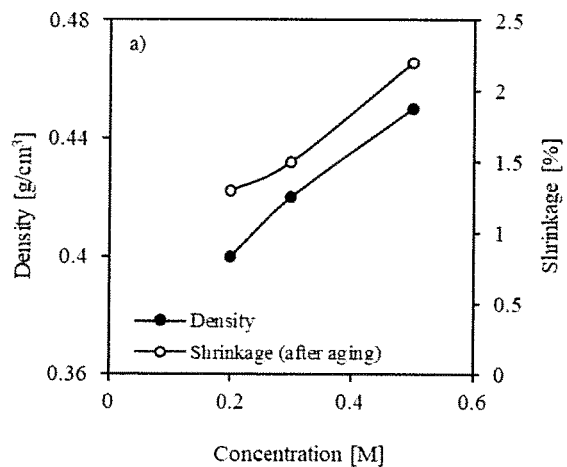
Figure 5A
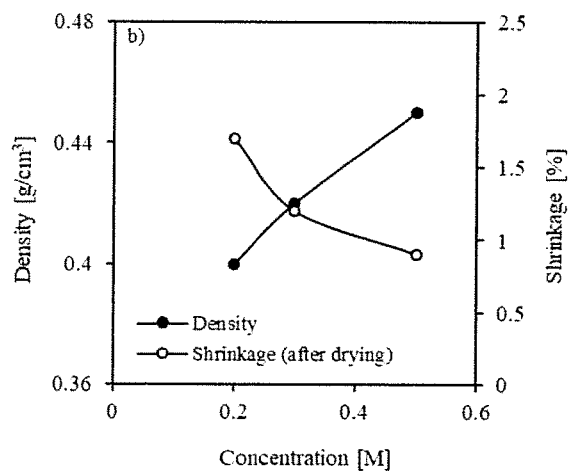
Figure 5B

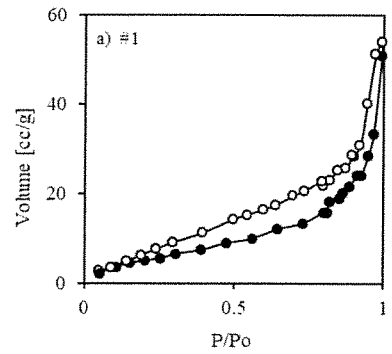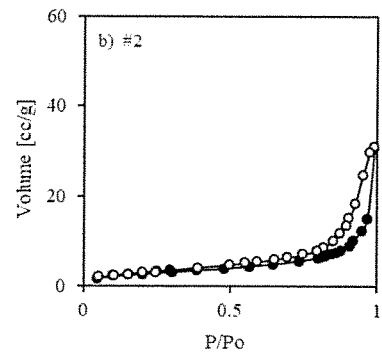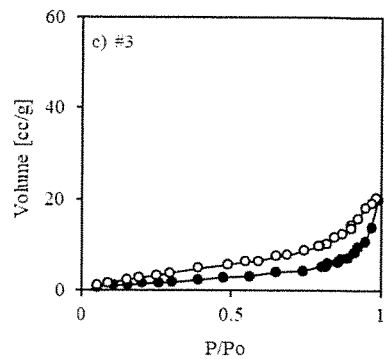
Figure 7A            Figure 7B            Figure 7C
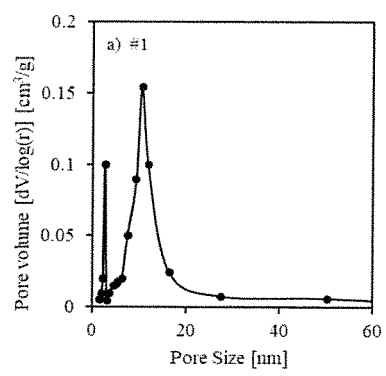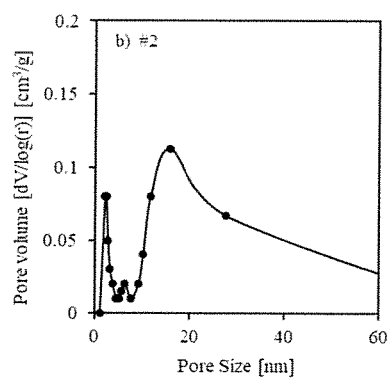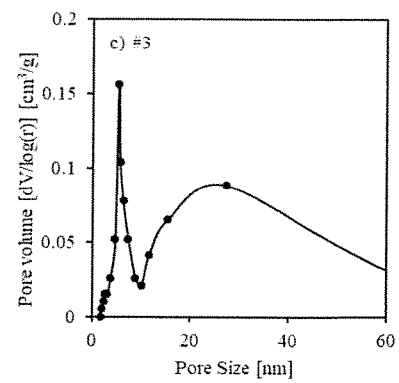
Figure 8A            Figure 8B            Figure 8C

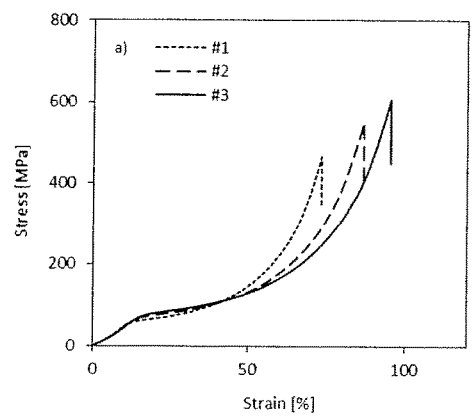
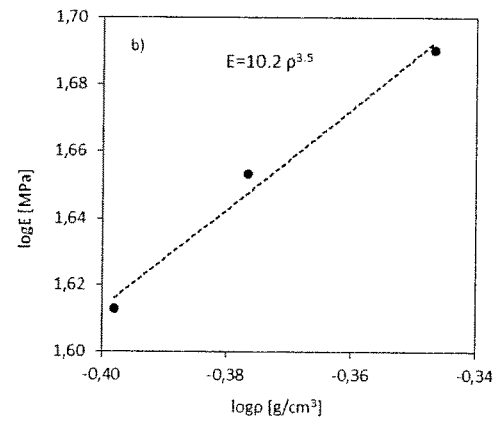
Figure 9A            Figure 9B
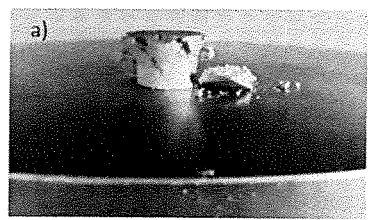
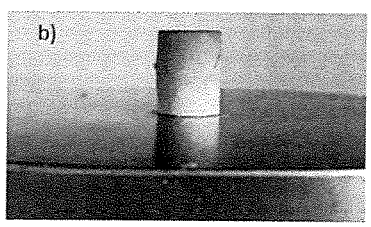
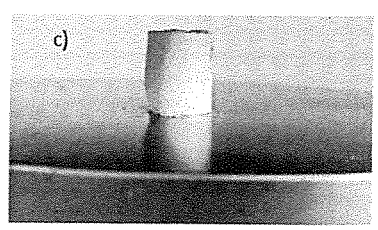
Figure 10A            Figure 10B            Figure 10C

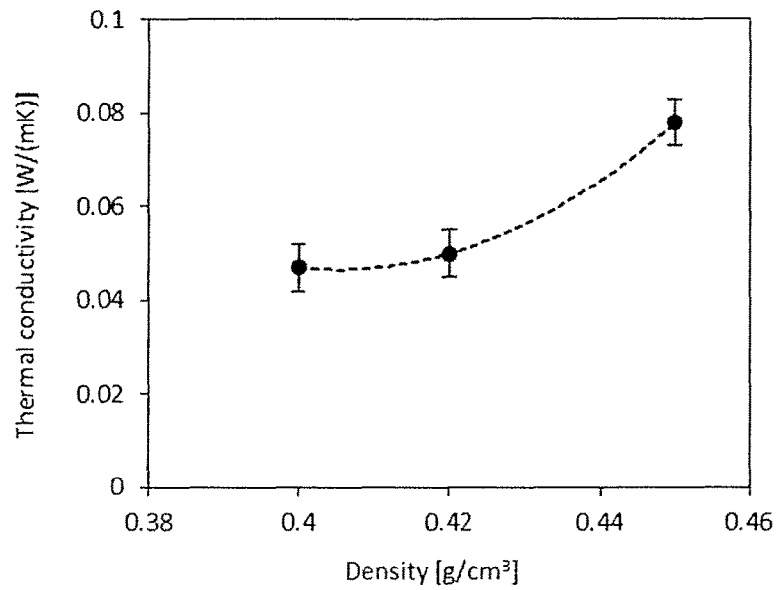
Figure 13
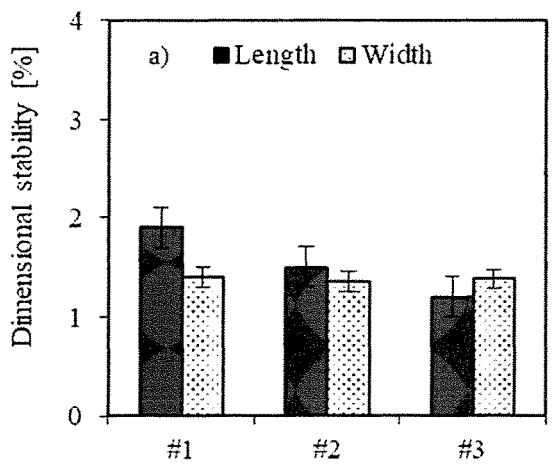
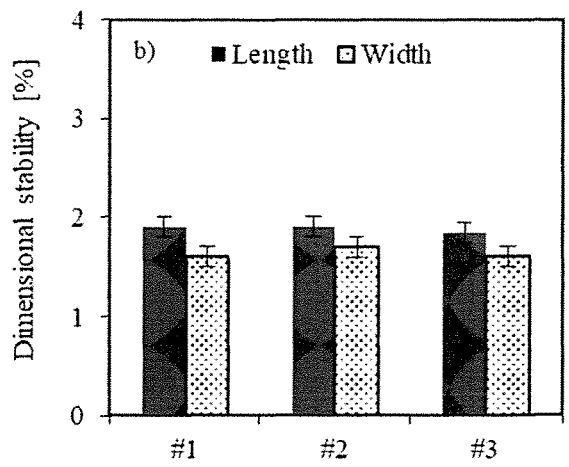
Figure 14A
Figure 14B

POLYMERIC AEROGEL COMPOSITE AND SYNTHESIS BY AMBIENT AND FREEZE-DRYING

STATEMENT OF GOVERNMENT SUPPORT

This invention was made with government support under grant numbers 93JK320C000007, EE0008223, and AR0000736 awarded by the Department of Transportation (DOT) and the Department of Energy (DOE). The government has certain rights in the invention.

FIELD OF THE INVENTION

The invention is generally related to methods to produce polymer composite aerogel reinforced with filler with a thermal conductivity and compressive modulus higher than conventional construction materials such as oriented strand board, and particularly to polymeric aerogels made with isocyanate or phenolic monomers.

BACKGROUND OF THE INVENTION

Aerogels are a unique class of materials offering a large number of interesting, desirable characteristics, such as high surface area (500-1200 $m^2/g$), high porosity (90-96%), low density (0.003-0.5000 $g/cm^3$), low thermal conductivity (0.017-0.021 W/m K) and a highly crosslinked structure [1-3]. Due to their advantageous properties, aerogels have enormous application potential in various fields, such as thermal insulators, energy conservation, catalyst supports, biomedical engineering and aerospace applications [3-7].

Among various aerogels, silica aerogel is the best-known and most extensively studied aerogel material. However, its poor mechanical properties greatly hinder its widespread application. Over the years, aerogel research has moved slowly from silica to several other kinds of polymer aerogels like cellulose [8-16], polystyrene [17], polysiloxane [18-20], polyurethane [21, 22], poly(vinyl alcohol) [23, 24], polyamide [25], polybenzoxazine [26] and polyimide [27-30]. These organic aerogels have thermal conductivity comparable to silica aerogels of similar density (only 0.014 W/m K for aerogels with density of 0.1 $g/cm^3$) but are much stronger with compressive moduli ranging from ~1 to ~40 MPa [17, 25, 27, 31-33].

Improving the mechanical properties of aerogels is necessary to make them readily suitable for potential applications such as their use in construction. For example, the materials must be hard enough to withstand drilling, nailing, etc. Different approaches have been taken to enhance the mechanical properties of these aerogels, such as the addition of clay [34], the creation of chemical crosslinks [35] or the reinforcement with natural [36], mineral [37] and glass fibers [34, 38]. For example, clay/poly(vinyl alcohol) composite aerogels, incorporating keratin fibers derived from chicken feathers, have been fabricated via a convenient freeze drying method by Sun et al. [39]. Aerogels reinforced with 3 wt % of keratin fibers exhibited high compressive moduli (from 3.9 to 15.7 MPa) and low thermal conductivity values (from 0.075 W/mK to 0.058 W/mK). Silica aerogels reinforced with aramid fibers (AF aerogels) have been fabricated by Li et al. [40] by ambient pressure drying. AF aerogels has a fiber content between 1.5 and 6.6 wt %, a compressive strength between 0.35 and 0.45 MPa, and a thermal conductivity as low as 0.0227 W/mK. Resorcinol-formaldehyde aerogel composites reinforced with polyacrylonitrile fibers with a thermal conductivity of 0.073 W/m K were prepared by Feng et al. [41]. The authors stated that crack-free carbon fiber reinforced carbon aerogels showed low shrinkage value (11%) due to the reduction of the inner stresses between the fibers and the aerogel. Graphene/cellulose (GC) aerogels were synthesized by Wan and Li [42]. Compared to cellulose aerogels (PC), GC aerogels had larger surface areas (205 $m^2/g$) and total pore volumes (1.11 $cm^3/g$). The Young's Modulus and energy absorption of GC aerogels increased 168% from 508 to 1361 kPa and 77% from 104 to 184 $kJ/m^3$, respectively. Mechanically strong polyimide/carbon nanotube composite (PI/CNT) aerogels were reported by Fan et al. [43]. PI/CNT aerogel had low density (~0.1 $g/cm^3$), improved compression modulus (33.5 MPa), and high thermal stability (above 580° C.).

As environmental considerations become more severe around the world, there is an increasing demand for raw materials based on renewable resources for the production of final materials. In this context, the use of renewable materials has increased. Hence, reinforcement with natural product fillers is a promising alley, especially when natural waste products are employed.

SUMMARY OF THE INVENTION

Disclosed herein are polymer aerogels reinforced with one or more natural or synthetic fillers (organic or inorganic), methods of making the polymer aerogels, and products made therefrom. The polymer aerogels exhibit desirable properties such as "workability" (e.g. they can be nailed, drilled, stapled, etc., without fracturing, cracking, crumbling or giving way), low thermal conductivity, high compressive moduli (strength), high density, and high porosity. The aerogels advantageously comprise particulate fillers that are or include waste materials such as wood flour, decreasing the need for virgin materials and permitting the capture of waste materials, thereby avoiding its buildup in landfills. Their low thermal conductivity and high mechanical strength makes them highly suitable as building materials that also provide insulation (thermal or acoustic). In addition, the methods of manufacture are straightforward and relatively low-cost.

An embodiment of the invention provides a polyurea aerogel reinforced with a natural filler. In some aspects, the natural filler is or includes wood flour. For example, wood flour (WF), due to its natural availability, compostability and nontoxicity, is an attractive candidate as a biodegradable filler for polymeric materials because of its low density and low cost [44]. WF itself is a complex, three-dimensional, polymer composite made up primarily of cellulose, hemicellulose, and lignin which can participate in several different chemical reactions [45]. In other aspects, the polyurea wood flour aerogel composite has a thermal conductivity below 0.08 W/mK, a compressive strength of at least 40 MPa, and a density of 400-500 $kg/m^3$.

In another embodiment of the invention, an aerogel composite includes i) a polymer formed from one or more isocyanate monomers and/or one or more phenolic monomers, water and additional monomers such as formaldehyde and furfuryl alcohol in the case of polymeric aerogels formed with phenolic monomers, and polyols in the case of polymeric aerogels formed with isocyanate monomers; and ii) a natural or a synthetic filler which has a plurality of hydroxyl groups. The polymer is crosslinked to or otherwise chemically bonded to the hydroxyl (OH) moieties of the filler. In some aspects, the filler is or contains cellulose. In further aspects, the filler is wood flour (wood flour contains cellulose, hemicellulose and lignin). In further aspects, the polymer is a polyurea (PUA). In yet further aspects, the isocyanate monomers are aliphatic or aromatic. In additional aspects, the isocyanate monomers are heterocycles. In still further aspects the monomers are phenolic monomers (e.g., exemplary polymeric aerogels being formed from resorcinol and formaldehyde). In yet other aspects, the aerogel has a thermal conductivity below 0.08 W/mK, a compressive strength of at least 40 MPa, and a density of 400-500 kg/m$^3$. In some aspects, the aerogel further comprises one or more synthetic or natural fibers dispersed in the polymeric aerogel composite.

Another embodiment of the invention provides a polymer aerogel composite. The polymer aerogel comprises one or more polymers (formed from one or more monomers) crosslinked to, bonded to, or otherwise associated with a natural or a synthetic filler (organic or inorganic). In some embodiments, the polymer is chemically bonded to the filler at one or more hydroxyl groups of the filler. In some embodiments, the filler is or contains cellulose. In some embodiments, the filler is or contains wood flour. In some embodiments, the polymer is a polyurea. In some embodiments, aliphatic isocyanate monomers are linked to form the polyurea. In some embodiments, the isocyanate monomers are heterocycles. In some embodiments, the monomers are phenolic monomers (e.g., exemplary polymeric aerogels being formed from, for example, resorcinol and formaldehyde). In some embodiments, the polymer aerogel composite displays a thermal conductivity below 0.08 W/mK, a compressive strength of at least 40 MPa, and a density of 400-500 kg/m$^3$.

Another aspect of the invention provides a method for the fabrication of a construction material comprising a polymer formed from one or more isocyanate or phenolic monomers and a natural or synthetic filler having a plurality of hydroxyl groups. Preferably, the polymer is chemically bonded to the filler. In some embodiments, the construction material is nailable or drillable without cracking. In some embodiments, the construction material comprising said polymeric aerogel has a thermal conductivity below 0.08 W/mK, a compressive strength of at least 40 MPa, and a density of 400-500 kg/m$^3$. In some embodiments, the construction material is formed as a four foot by eight foot sheet. In some embodiments, the polymer is polyurea, polyurethane, polyisocyanourate, or polyurethane-polyisocyanourate. In some embodiments, the polymer is a polyphenolic such as resorcinol-formadehyde polymers. In some embodiments, the filler is wood flour or other cellulose containing material. In some embodiments, the construction material comprises one or more synthetic or natural fibers dispersed in the polymeric aerogel composite. In other embodiments, the polymeric aerogel constructed from waste material, cellulose (e.g., wood flour), and isocyanate monomers, phenolic monomers, water and polyols, also includes fibers (e.g., aramid fibers, keratin fibers, etc.).

Another aspect of the invention provides a method for forming an aerogel composite. The method includes combining a polymer containing one or more isocyanate monomers and one or more natural or synthetic fillers having a plurality of hydroxyl groups. Once combined, a gel is formed by causing the polymer to chemically bond to said filler at one or more of the hydroxyl moieties. The gel is then dried to produce a polymeric aerogel composite. In some embodiments, the polymeric aerogel composite is dried by freeze-drying.

Another aspect of the invention provides a method for extruding and/or 3D printing of an aerogel composite. The method includes combining a polymer containing one or more isocyanate monomers and one or more natural or synthetic fillers having a plurality of hydroxyl groups, or combining a polymer containing one or more phenolic monomers and one or more natural or synthetic fillers. Once combined, a sol is formed where the polymer chemically bonds to the filler at one or more of the hydroxyl moieties. The viscosity of the sol increases with time, until gelation occurs. The sol is poured into a mold, or extruded, or used as an ink for 3D printing when the viscosity is sufficiently high, typically immediately before gelation.

In some embodiments, the polymeric aerogel composite is dried by freeze-drying. In some embodiments, the polymeric aerogel composite is dried by heating. In some embodiments, the polymeric aerogel composite is dried at ambient temperature and ambient pressure.

BRIEF DESCRIPTION OF THE DRAWINGS

FIG. 4. Morphology of polyurea/wood flour (PUA/WF) aerogel composites showing that the morphology of the composites depends of the concentration of the monomers. Increasing the monomer concentration leads to a denser structure.

FIGS. 5A and B. Shrinkage and density of aerogel composites prepared using different isocyanate concentrations after A, aging and B, freeze drying.

FIG. 7A-C. BET isotherms of A, sample 1, B, sample 2, and C, sample 3.

FIG. 8A-C. Pore size distribution of A, sample 1, B, sample 2, and C, sample 3.

FIGS. 9A and B. A, stress-strain curves for aerogel composites and B, log-log plot of E as a function of p.

FIG. 10A-C. Pictures of A, sample 1, B, sample 2 and C, sample 3 after compression testing.

FIG. 13. Thermal conductivity of the aerogel composites as a function of density.

FIGS. 14A and B. Thermal stability of aerogel composites measured by linear dimension change during A, temperature and B, humidity exposition.

DETAILED DESCRIPTION

Figures 1A, 1B:
FIGS. 1A and B. Scanning Electron Micrograph images of Wood Flour (WF) at two different magnifications.

The present disclosure provides polymeric aerogel composites, methods of making the polymeric aerogel composites, and products made from the polymeric aerogel.

By polymeric aerogel, also referred to herein as polymer aerogel composite or aerogel with filler composite, we mean a porous material of polymer reinforced with natural or synthetic (organic or inorganic) filler where the polymer is formed by drying a gel to leave a solid porous polymer matrix. In particular, embodiments of this invention are concerned with polymeric aerogels made from isocyanate monomers, with polyurea aerogels, polyurethane aerogels, polyisocyanourate aerogels, or polyurethane-polyisocyanourate aerogels being exemplary materials. However, other organic aerogels, such as resorcinol-formaldehyde and other phenolic aerogels that can also bind to surface OH groups of fillers, may be used in various embodiments of this invention.

The polymeric aerogel composites of the present invention can be employed as construction materials, thermal insulating materials, and acoustic insulating materials. They have a lower density compared to other construction materials such as conventional composite board, particleboard, hardboard, medium density fiberboard, high density fiberboard, and oriented strand board. The polymeric aerogel composites have also a thermal conductivity lower than that of most construction materials. The minimum value of exemplary polymeric aerogel composites according to this invention have a thermal conductivity (0.047 W/mK) which is significantly lower than many other commercial wood-based construction materials (~0.100 W/mK). Thus, these polymeric aerogel composites are a good (or superior) alternative to commercial wood-based materials. In addition, the polymeric gel composites have a compression modulus of 42-50 MPa such as 42, 43, 44, 45, 46, 47, 48, 49, 50. Hence, the polymeric aerogel composites are an alternative to rigid polyurethane foams (RPUFs) and can be used in the field of building construction as a thermal insulation material, such as e.g. for separating walls, in roof insulation, as electrical insulation, or as a structural component in sandwich, honeycomb or multilayer structures.

In one embodiment, the polymeric aerogel composite is made from isocyanate containing polymers. That is, the polymers are formed from one or more isocyanate monomers polymerizing with one or more other monomers. By isocyanate monomers we mean a chemical substance that contains the functional group —N=C=O, and preferably two or more of this functional group (e.g., diisocyanates, triisocyanates, etc.). Generally, the monomers are capable of being chemically linked with each other or with other molecules to form e.g. polymeric chains or networks. In general, the isocyanates react with water, multifunctional amines such as triethanolamine or alcohols to form polyurea and polyurethane polymers. Polyureas are typically made by combining multifunctional isocyanates with multifunctional amines such as triethanolamine, alcohols or water. Polyurethanes are typically made by combining multifunctional isocyanates with polyols. The isocyanates can be divided into three main groups including mono-isocyanates, di-isocyanates and poly-isocyanates depending on the number of isocyanate groups present in the monomer.

Suitable isocyanate compounds for use in the present invention typically have a functionality equal or greater than 2. Preferably, said isocyanate compound has a functionality from about 2 to about 6, and more preferably a functionality from about 2 to about 3. By the term 'functionality' is meant herein the number of isocyanate groups in the compound. Suitable isocyanate compounds for use in the present invention include but are not limited to aromatic isocyanate compounds and aliphatic isocyanate compounds.

Examples of suitable aliphatic isocyanate compounds 1-8 are:

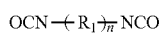

1

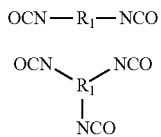

2

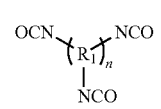

3

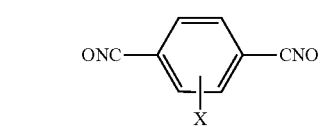

4 wherein $R_1$ is, for example, a single bonded O, S, CO, $SO_2$, $O_3P=S$, a substituted or unsubstituted C1-C30 alkyl group, a substituted or unsubstituted C3-C30 cycloalkyl group, a substituted or unsubstituted aryl group, a substituted or unsubstituted C7-C30 alkylaryl group, a substituted or unsubstituted C3-C30 heterocycloalkyl group and a substituted or unsubstituted C1-C30 heteroalkyl group, or a combination of thereof; where the integer n is 1 to 30.

Examples of suitable aromatic isocyanate compounds 5-8 for use in the present invention include but are not limited to:

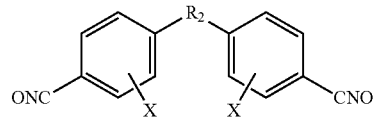

5

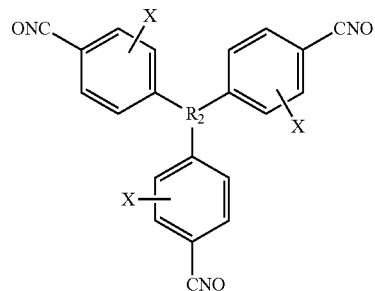

6

7

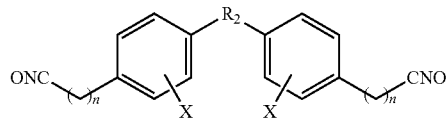

8 wherein X represents a substituent, or different substituents, and is selected independently from, for example, hydrogen, halogen and linear or branched C1-C6 alkyl groups, attached on their respective phenyl ring at the 2-position, 3-position or 4-position, and/or their respective isomers; and wherein $R_2$ is, for example, a single bonded O, S, CO, $SO_2$, $O_3P=S$, a substituted or unsubstituted C1-C30 alkyl group, a substituted or unsubstituted C3-C30 cycloalkyl group, a substituted or unsubstituted aryl group, a substituted or unsubstituted C7-C30 alkylaryl group, a substituted or unsubstituted C3 to C30 heterocycloalkyl group and a substituted or unsubstituted C1-C30 heteroalkyl group, and combinations thereof, and wherein the n is and integer from 1 to 30.

Preferably, the isocyanate compound is, for example, 1,3,5-tris(6-isocyanatohexyl)-1,3,5-triazinane-2,4,6-trione, methylene diphenyl diisocyanate (MDI), 1-[bis(4-isocyanatophenyl)methyl]-4-isocyanatobenzene, 2,4-diisocyanato-1-methyl-benzene (TDI), 5-isocyanato-1-(isocyanatomethyl)-1,3,3-trimethyl-cyclohexane (IPDI), 1,6-diisocyanatohexane (HDI), isomers thereof, oligomers thereof and mixtures thereof. Suitable commercially available isocyanates for use in the present invention are for example but not limited to DESMODUR® RE (a solution of triphenylmethane-4,4',4"-triisocyanate in ethyl acetate), DESMODUR® L75 (aromatic polyisocyanate based on tolulene diisocyanate), DESMODUR® N3300A (solvent free polyfunctional aliphatic isocyanate resin based on hexamethylene diisocyanate) (HDI), DESMODUR® N3200 (aliphatic polyisocyanate (low-viscosity HDI biuret), DESMODUR® HL (aromatic/aliphatic polyisocyanate based on toluylene diisocyanate/hexamethylene diisocyanate), DESMODUR® IL (aromatic polyisocyanate based on toluene diisocyanate) and DESMODUR® RFE (solution of tris(p-isocyanatophenyl) thiophosphate in ethyl acetate), all of which are available from Covestro; Polurene KC and Polurene HR diisocyanates (toluene diisocyanate and diphenylmethane; and toluene diisocyanate, respectively) from Sapici; etc. Preferably, the isocyanate compound is present in the reaction mixture from about 0.01 to about 15% by weight of the total weight of the reaction mixture (including solvent), and more preferably from about 0.2 to about 0.5%.

In some aspects, the polymeric aerogel composite is made from poly(isocyanurate) (PIR) polymers. In one embodiment, the PIR aerogel composite is made from isocyanate, a polyol, in presence of a catalyst and an appropriate solvent and wood flour. Preferably, the polyol compound contains two or more hydroxyl groups. Examples include but are not limited to phenol, cresol, ethylphenol, xylenol, p-tert-butylphenol, octylphenol, nonylphenol, dodecylphenol, p-phenylphenol, m-chlorophenol, o-bromophenol, resorcinol, catechol, hydroquinone, phloroglucinol, alpha-naphthol, beta-naphthol, phloroglucinol (POL), and 1,1,1-tris(hydroxyphenyl)ethane. The structures of some polyols which can be combined to form polyurethane/polyisocyanurate (PUR-PIR) aerogels within certain embodiments of the invention include but are not limited to

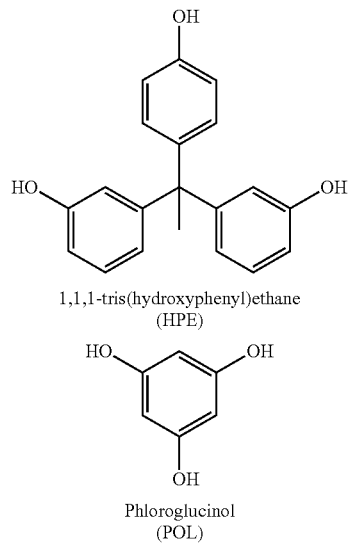

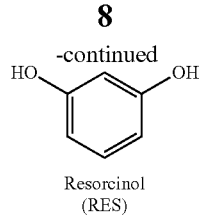

Resorcinol
(RES)

In some embodiments the polymeric aerogel composite is made from phenolic monomers chemically reacted with a second monomer to produce the polymeric aerogel. Suitable phenolic monomers are aromatic polyols such as resorcinol, phoroglucinol, 1,1,1-tris(hydroxyphenyl)ethane, phenol, cresol, ethylphenol, xylenol, p-tert-butylphenol, octylphenol, nonylphenol, dodecylphenol, p-phenylphenol, m-chlorophenol, o-bromophenol, catechol, hydroquinone, alpha-naphthol, beta-naphthol, etc. The second monomer would be any monomer which can react with the phenolic monomer to produce a polymeric aerogel. Exemplary second monomers are formaldehyde and furfuryl alcohol. Such reactions may be catalyzed using acid catalysts such as $HClO_4$, $HNO_3$, HCl, $CF_3COOH$, etc., or using basic catalysts such as $Na_2CO_3$, etc.

In one embodiment, a polymeric aerogel composite according to the present invention is prepared according to a method comprising the following steps:
1) forming a sol from at least one monomer dissolved in an organic solvent,
2) mixing the sol with a filler comprising hydroxyl groups to form a gel (sol-gel), wherein the filler is dispersed in the sol,
3) aging the gel in a mold or extrusion vessel,
4) removing or extruding the gel from the mold or extrusion vessel (extruding may be in the form of 3D printing), and
5) drying the gel to form the aerogel.

In some aspects, according to this present disclosure, polyurea aerogels were prepared by dissolving isocyanate monomers in at least one polar organic solvent, preferably an aprotic solvent such acetone. Polar aprotic solvents are preferred because they do not have hydrogen atoms that can be donated into an H-bond. Therefore, anions participating in the nucleophilic addition reaction are not solvated, and they are not inhibited to react. Sol formation requires a catalyst. Suitable catalysts include basic amine but are not limited to: triethylamine, trimethylamine, benzyldimethylamine (DMBA), N,N-dimethyl-1-phenylmethanamine, 1,4-diazabicyclo[2.2.2]octane, 2-ethyl-4-methylimidazole, 2-phenylimidazole, 2-methylimidazole, 1-methylimidazole, 4,4'-methylene-bis(2-ethyl-5-methylimidazole), 3,4,6,7,8,9-hexahydro-2H-pyrimido[1,2-a]pyrimidine, 2,3,4,6,7,8,9,10-octahydropyrimido [1,2-a]azepine, 1,8-diazabicyclo[5.4.0]undec-7-ene (DBU), 1,5,7-triazabicyclo[4.4.0]dec-5-ene (TBD), 1,4-diazabicyclo[2.2.2]octane, 1,5-diazabicyclo[4.3.0]non-5-ene, quinuclidine and mixtures thereof. Other suitable catalysts include general formula: $M_a^1[M^2(CN)_b(A)_c]_d \cdot wM^3D_e \cdot xH_2O \cdot yL \cdot zH_nE_m$ wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, D and E each represent an anion which may be the same or different; L represents an alcohol, aldehyde, acetone, ether, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of M3; n and m are integers satisfying the electroneutrality of HE, and w is a number between 0.1 and 4; x is a number up to 20; y is a number between 0.1 and 6, and z is a number between 0.1 and 5 and mixture thereof. Gelation is generally carried out in a mold at a preset temperature such as about 20° C. to about 40° C., such as about 30° C. Heat may be applied to shorten the time to prevent the precipitation of the filler out of solution, but it is not necessary. In some embodiments, drying can proceed at room temperature if the filler is present in low concentrations or is stable in solution. The gelation time in preferably from about 15 min to about 24 h, preferably from about 20 min to about 10 h and more preferably from about 30 min to about 4 h. The reaction time and gelation time depends of the monomer and its concentration, and may also depend on the temperature of curing, the type of catalyst and the concentration of catalyst.

In some aspects, drying is performed at supercritical conditions by exchanging the solvent in the gel with a supercritical fluid such as supercritical $CO_2$ or other suitable solvents such as acetone, ethanol, acetonitrile or methanol.

Alternatively, the polymeric aerogel composite is freeze dried using the gelation solvent or after exchanging the gelation solvent with a freeze-dryable solvent such as tert-butanol, dioxane, benzene, cyclohexane, acetonitrile, camphene, or naphthalene, etc. The polymeric aerogel composite can be freeze dried in a solvent mixture with an eutectic point, such as tert-butanol and water.

Alternatively, and possibly preferably for low-cost production purposes, wet gels can be dried at ambient conditions, in which the solvent is evaporated at room temperature and ambient pressure. If this procedure is used, the aerogel can be extruded into a desired shape and/or placed in a mold having a desired shape, or 3D printed, prior to drying. In this aspect, the gelation solvent is typically exchanged with a solvent which freezes at or above room temperature at ambient pressure, and the frozen solvent is then evaporated at ambient pressure. One can also exchange the gelation solvent with a solvent which has a low surface energy, such as pentane or hexane, and let the solvent evaporate from the liquid phase under ambient conditions.

The polymeric aerogel composite according to the present invention comprises filler compositions (either natural or synthetic), and may be organic, inorganic (or both) compounds. The filler is typically particulate or granular in nature, e.g. the filler may be a powder or other material comprised of e.g. nano- or micron-scaled particles. Examples of suitable "natural" fillers include but are not limited to: wood flour or a wood product such as wood dust, wood chips, cellulose or lignin. Examples of suitable "synthetic" fillers include but are not limited to: powdered silica or other mineral oxides, titanium oxide, aluminum oxide, tungsten oxide, zinc oxide being typical examples. A suitable filler is also one that possesses available, usually surface accessible hydroxyl group (OH). Fillers can be added in any concentration, from about 90% (wt %) to about 1% (wt %), e.g., from about 5%-50% filler, e.g. preferably about 25% (wt %), in the production of the polymeric aerogel composite.

In one embodiment the polymeric aerogel composite is formed from a polyurea polymer, polyurethane (PUR) polymer, polyisocyanourate (PIR) polymer, a PUR-PIR polymer, a phenolic resin, and a natural filler. The natural filler, which could be wood flour, is chemically bonded to the polymeric aerogel. In particular, the natural filler and polymeric aerogel maintain good adhesion without cracks being formed in the composite. That is, the microstructure is such that, for example, the wood flour is integrated with and forms part of the microstructure of the polymeric aerogel composite. The morphology of the composite depends on the concentration and the type of monomers in the parent solution of the sol. After drying, the strength of the polymeric aerogel composite is directly proportional to the concentration of monomers and filler. Most importantly, the shrinkage of the prepared aerogel composites is negligible and all composites retain their original shape without meaningful shrinkage. This can be attributed to the fact that the interactions between polymer chains and, for example, wood flour fibers can form crosslinking points through chemical bonding. The crosslinking of polymer and fillers overcomes the natural tendency of polymers to form hydrogen bonds, the expansive force in the crystal growth process (in case of freeze-dried aerogels) and the capillary forces (in case of ambient drying by evaporation of a liquid solvent). The polymeric aerogel composites have satisfactory mechanical properties for many applications, including construction applications. Young's Modulus for an exemplary construction material for this invention is about 45 to 50 MPa, such as about 45, 45.2, 45.3, 45.5, 46, 47, 48, 49, 49.5, 49.6, 49.7, 49.8, 49.9 and 50 MPa.

By incorporating different amounts or ratios of starting materials into the aerogels, it is possible to "tune" the aerogels to have desired properties. For example, the level of thermal conductivity can be altered and/or adjusted as needed, as can the flexibility, density, water absorption, porosity, etc. Thus, lighter or heavier materials, more or less flexible materials, etc. may be formed and used for different purposes.

Products Made from the Aerogels

Many different types of products can be advantageously made from the aerogel composites, either fully or in part. For example, the aerogel composite is especially useful when a material with thermally insulating properties is desired. Thus, one embodiment encompasses a thermal insulating material or an acoustic insulating material comprising an organic aerogel according to the present invention.

Polymeric aerogel composites according to the present invention can be used in construction, building or carpentry materials due to their light weight, strength, and ability to be formed into desired shapes and superior thermal insulation properties. Examples of such materials include but are not limited to: sheathing; siding; shingles; underlayment; flooring; boards of any size or type; trim and molding; roofing, window sashes, doors etc. The polymeric aerogel composites can be used in applications that typically utilize e.g. plywood, press board, etc. or even wood, e.g. in the manufacture of furniture, shelving, etc. In addition, the articles can be used internally in a final product (e.g. underneath siding of a house) or may be surface exposed (e.g. siding, trim, etc.). If a surface is exposed, the articles manufactured from the aerogels may be patterned, e.g. a pattern may be etched on at least one surface of the article, or the article may be molded, extruded or 3D printed so as to have a pattern on at least one surface. In fact, the polymeric aerogel composites exhibit advantages over e.g. plywood because they can be readily molded to a desired shape. In addition, articles formed from the aerogels may be layered, having at least one layer that is formed from aerogel and at least one additional layer of a material (such as a patterned polymeric material, or a wood veneer) attached thereto, e.g. by an adhesive.

Figure 16:
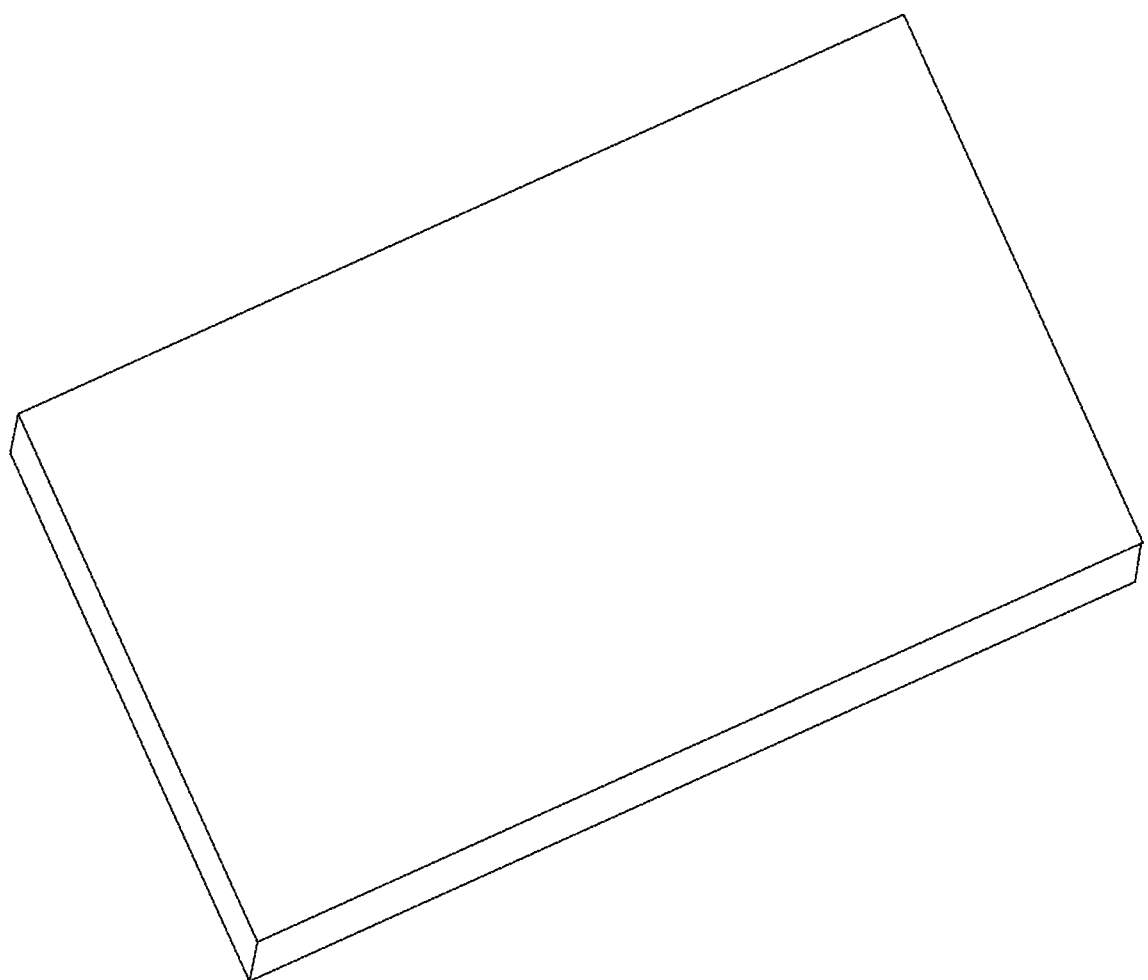
FIG. 16. Exemplary construction material as described herein in the form of a four by eight sheet of e.g. sheathing.

With reference to FIG. 16, a construction material for exemplary purposes is a four by eight foot sheet board, similar to conventional composite board, particleboard, hardboard, medium density fiberboard, high density fiberboard, plywood board or oriented strand board is herein described. The construction material could be of any suitable size (e.g., 4 ft by 8 ft is the most common size available at US hardware stores, but 4 ft by 12 ft is commonly used, and sizes which fit metric applications (e.g., construction in Europe) can readily be produced). In addition, while FIG. 16 depicts a flat construction board, it should be recognized that, based on how the construction material is produced, it can be made in a variety of shapes. Further, the construction may also be extruded to form a variety of materials (e.g., floor trim, crown molding, etc.), and might also be 3D printed into a desired shape. The construction materials of the invention are a nailable, drillable, cuttable (e.g. sawable), and sandable. These operations may be performed on the polymeric aerogel composite without cracking or flaking, similar to such operations which are performed with oriented strand board, particle board, or plywood.

Organic aerogels according to the present invention can be also used for storage of cryogens.

Organic aerogels according to the present invention can be also used in safety and protective equipment as a shock-absorbing medium.

Organic aerogels according to the present invention can be also used in safety and protective equipment as a sound-absorbing medium.

Figure 17:
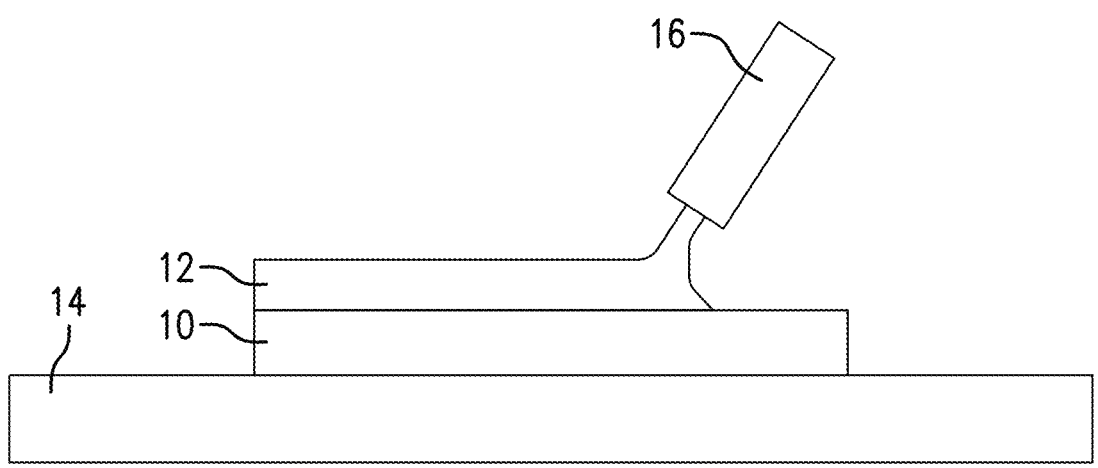
FIG. 17. Examples of fabrication by extrusion and 3D printing.
Figure 18:
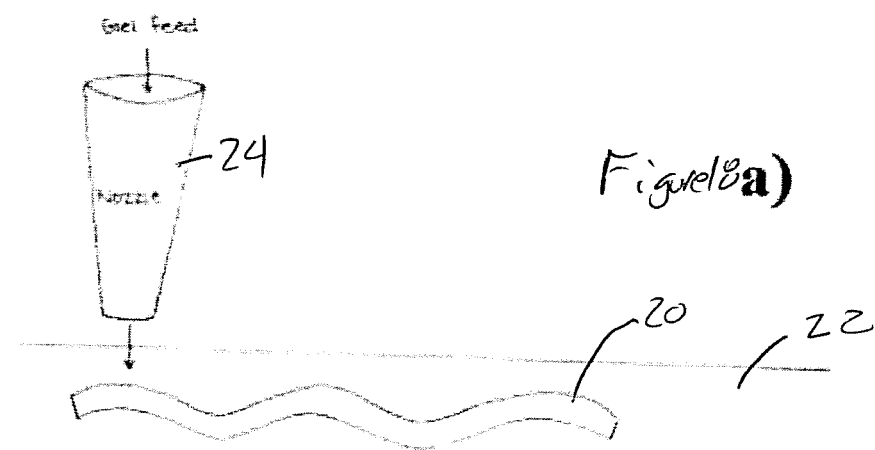
Figure 18:
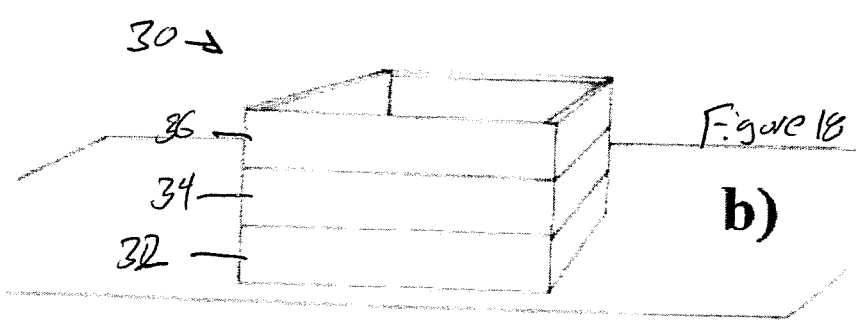
Figure 18:
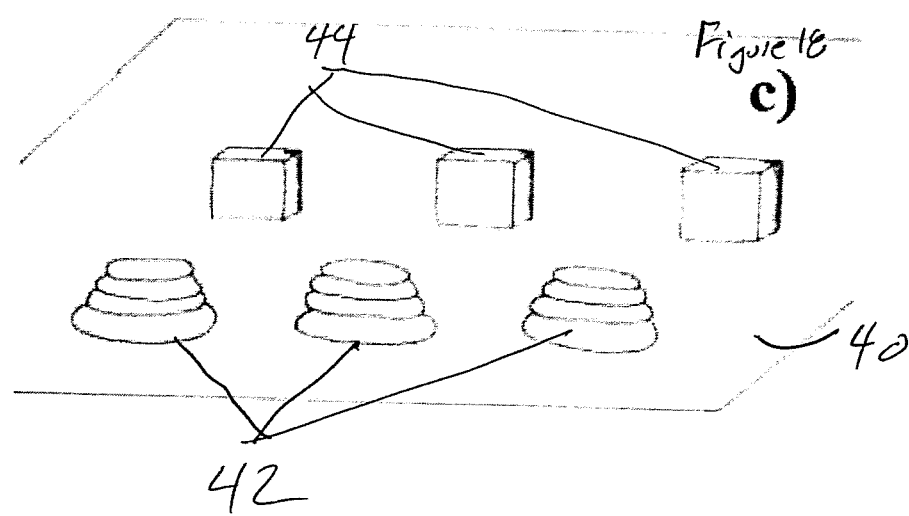

FIG. 17 illustrates the polymer aerogel composites of the present invention used in a 3D printing operation. Multiple layers 10 and 12 are deposited at specific locations on a substrate 14, usually under the control of a computer (not shown) that controls the positioning of an extrusion head 16. The layers can be built up in precise locations to produce desired three dimensional objects of almost any shape. In this application, the sol-gel 18 is printed using the extrusion head, and, once the multilayered structure is dried, a three dimensional polymeric aerogel object is produced.

It is to be understood that this invention is not limited to particular embodiments described herein above and below, and as such may, of course, vary. It is also to be understood that the terminology used herein is for the purpose of describing particular embodiments only, and is not intended to be limiting.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

EXAMPLES

Materials and Methods

Materials. DESMODUR® N3300A triisocyanate was supplied from Covestro Corporation. Triethylamine (Et3N) (99% pure), Acetone (99.8% pure) and tert-Butanol (99.5% pure) were purchased from Fisher Scientific. Wood flour was supplied by System Three Corporation. The structure of WF is presented in the scanning electron micrographs (SEM) of FIG. 1.

Composites of polyurea (PUA) aerogels with wood flour were prepared on a laboratory scale. All formulations are summarized in Table 1.

TABLE 1

Formulations of aerogel composites.

| Sample code | concentration of DESMODUR ® (g) | wt % $H_2O$ (ml) | wt % $Et_3N$ (ml) | wt % wood flour (g) |
|---|---|---|---|---|
| 1 | 0.2 (1.170) | 3.0 (0.125) | 0.6 (0.072) | 25 (0.680) |
| 2 | 0.3 (1.755) | 3.0 (0.188) | 0.6 (0.079) | 25 (0.730) |
| 3 | 0.5 (3.511) | 3.0 (0.376) | 0.6 (0.093) | 25 (0.860) |

Figure 2:
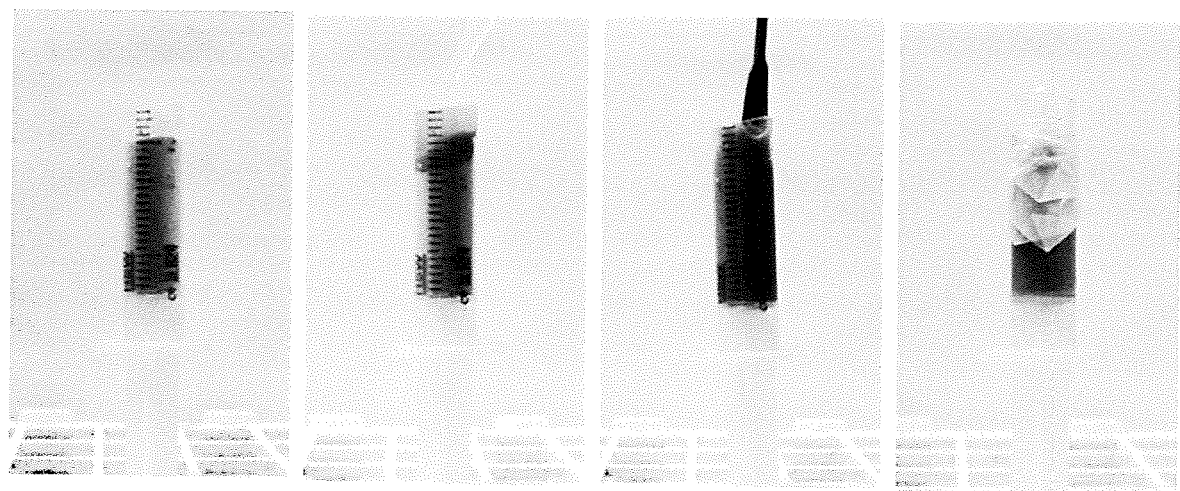
FIG. 2. Preparation of WF polymer aerogel composites.

PUA aerogels were prepared by varying the concentration of the monomer by first dissolving 1.170, 1.175 and 3.500 g of DESMODUR® N3300A in a constant volume (10 ml) of dry acetone. Subsequently, for each monomer concentration 3.0 wt % of water was added, and sols were obtained by adding triethylamine 0.6 wt % (relative to the total weight of the isocyanate monomer plus solvent). The final N3300A monomer concentrations were approximately 0.2, 0.3 and 0.5 M, respectively. WF in an amount of 0.700 g was placed in polypropylene syringes used as molds (the top part of the syringes was cut off with a razor blade). The sol was shaken vigorously. About 3 ml of previously prepared gel solution sols were pipetted into syringe vials. Such prepared composition was mixed with a spatula and the syringe was covered with multiple layers of Parafilm (FIG. 2). All gels were aged for one day at 30° C. Subsequently, gels were removed from their molds and placed individually into fresh acetone (approximately 4×the volume of each gel). The solvent was changed two more times every 4 hours. Aerogel composites were prepared by freeze-drying (FD). The acetone solvent was exchanged with tert-Butanol (about 4×the volume of gel, 3 times every 4 hours). Finally, the gel containing tert-Butanol was frozen at −10° C. in a commercial refrigerator and freeze dried at a shelf temperature of −7° C. at a pressure <3 Torr.

The chemical structures of WF and aerogel composites were determined by Fourier transform infrared spectroscopy (FTIR). FTIR spectra were collected for the wavelength range of 3500-400 cm$^{-1}$ at a resolution of 4 cm$^{-1}$ using a Nicolet 6700 FTIR Spectrometer (Thermo Fisher Scientific, Germany). FTIR was performed with a DGTS/KBr detector. Data processing was performed using OMNIC 3.2 software developed by Thermo Scientific Products (Thermo Fisher Scientific, Germany). The average of 64 individual scans were obtained and the average spectrum was presented.

Scanning Electron Microscope Hitachi SU-70 (Hitachi Instrument, Japan) was used to image aerogel composites. The nominal thickness of the samples was about 1 mm and the samples were placed on carbon conductive tabs adhered to the sample mount. A strip of adhesive copper tape, connecting with the sample and the sample mount, was placed in contact with each piece of aerogel to avoid charging during imaging. The samples were sputter-coated for 150 s with platinum to reduce charging during imaging.

The density of the aerogel composites was determined by weight and volume measurements.

Surface area and pore volume analyses were determined from the nitrogen adsorption-desorption isotherms at 77K (−196° C.) using a Quantachrome Nova 2200e Instrument (Quantachrome Ltd., USA). The surface area was calculated by the Braunauer-Emmett-Teller (BET) method. The pore size distribution was determined by applying Barett-Joyner-Halenda (BJH) mode from the desorption isotherms. The samples were degassed at 130° C. for 24 h prior to adsorption measurements until the mass attained a constant value.

Compression tests were carried out on the universal testing machine ZwickLine Testing Machine (Zwick/Roell Group, Germany). Sample contact surfaces were cut parallel and the samples were tested according to the ASTM D695 Standard in ambient conditions. Tests were performed with a 2 kN load cell and using a compression rate of 2 mm/min. The samples were compressed up to a deformation of 70% to obtain the stress-strain curve to calculate the value of Young's modulus.

The thermal properties of the synthesized composites were evaluated by Thermogravimetric analysis (TGA) measurements performed using the STA 449 F1 JUPITER® Analyzer (Netzsch Group, Germany). About 10 mg of the sample was placed in the TG pan and heated in an argon atmosphere at a rate of 10° C./min up to 600° C. The initial decomposition temperatures, $T_{10\%}$, $T_{50\%}$ and $T_{80\%}$ of mass loss were determined.

Dynamic mechanical analysis (DMA) was determined using an ARES Rheometer (TA Instruments, USA). Torsion geometry was used with samples of thickness 2 mm. Measurements were examined in temperature range 20-250° C. at a heating rate of 10° C./min, using frequency of 1 Hz and applied deformation at 0.1%.

A LaserComp 50 heat flow meter apparatus (LaserComp Inc., USA) with a 2.5 cm×2.5 cm size heat flow transducer was used to measure the thermal conductivity of PUA aerogel, which was cut into a square size of 5 cm×5 cm with 1.85 cm thickness. The upper and lower plates of the instrument were set at 5° C. and 45° C., respectively, with a mean temperature of 25° C. Prior to testing the aerogel sample, the instrument was calibrated using a similar thermal conductivity reference sample to improve the accuracy of the measurement.

Changes in the linear dimensions were determined after conditioning at the temperature of 70° C. and humidity of 70% for 14 days. Changes in linear dimensions were calculated in % from equation 1

$$\Delta l = ((l - l_o)/l_o) \cdot 100 \quad (1)$$

where $l_o$ is the length of the sample before thermostating and l is the length of the sample after thermostating. An average of 5 measurements was taken for each composition.

Surface hydrophobicity was analyzed by contact angle measurements using the sessile-drop method with a manual contact angle goniometer with an optical system OS-45D (Oscar, Taiwan) to capture the profile of a pure liquid on a solid substrate. A water drop of 1 μL was deposited onto the surface using a micrometer syringe fitted with a stainless steel needle. The contact angles reported are the average of at least ten tests on the same sample.

Water absorption of the aerogel composites was measured according to ASTM D2842 [49], equivalent to ISO 2896 [50]. Samples were dried for 1 h at 80° C. and then weighed. The samples were immersed in distilled water to a depth of 1 cm for 24 h. Afterwards, the samples were removed from the water, held vertically for 10 s, the pendant drop removed and then blotted between dry filter paper (Fisher Scientific, USA) at 10 s and weighed again. An average of 5 specimens was used.

Results and Discussion

Figure 3:
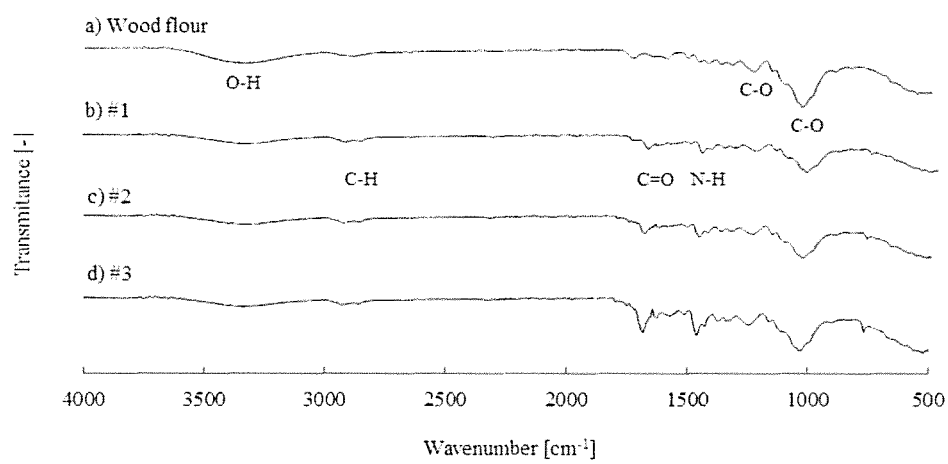
FIG. 3. FTIR of the WF and PUA/WF aerogel composites indicating the cross-linking between the monomer and hydroxyl groups at the surface of the filler.

FIG. 3 shows a Fourier transform infrared (FTIR) spectrum of wood flour in trace a. WF is a natural macromolecule containing mainly cellulose, hemicellulose, and lignin, and comprises many hydroxyl groups [51-55]. The spectrum confirms the presence of reactive groups in the filler. An intense band at 1020 cm$^{-1}$ indicates the presence of C—O stretching vibration of secondary alcohols [51]. The absorbance peaks in the 3400-3300 cm-1 region is attributed to the stretching vibrations of the OH groups of cellulose and the elongation of adsorbed water molecules [51, 56-58]. The peak at 1225 cm$^{-1}$ corresponds to C—O stretching of the aryl group in lignin [51, 52, 59].

Since WF has polar groups and hydrophilic properties, strong interfacial interaction, such as hydrogen bonding, can occur between the WF molecules and isocyanate, leading to the formation of a cross-linked structure. Hydroxyl groups present in WF molecules can react with isocyanates even in the absence of catalyst [60-63]. The scheme of the hydroxyl reaction with isocyanate is shown in equation (2). A urethane bond is formed as the end-product of the reaction. [60-63]. When WF contains moisture, isocyanate will react with the water, as shown in equation (3), which hinders the formation of carbamate and, to an extent, prevents effective bonding.

The reactions shown in equations (2) and (3) are competitive. Thus, the filler should thoroughly dried before use, for example by heating it overnight in a convection oven kept at 70° C.

(2)

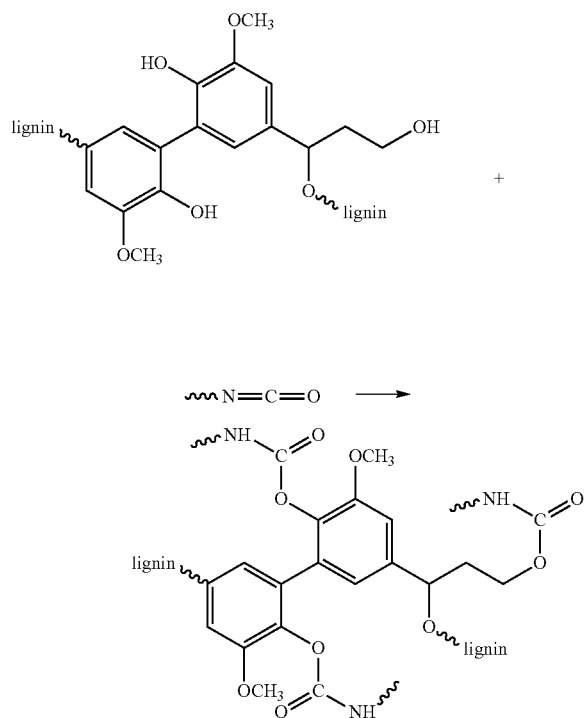

(3)

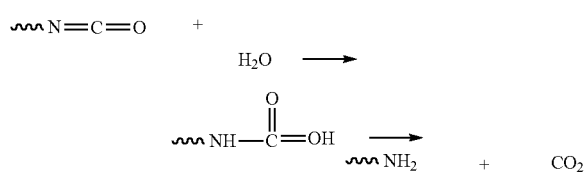

As shown in traces b, c and d of FIG. 3, the urethane moieties of aerogel composites are confirmed by the presence of the main characteristic absorption bands. These bands are the characteristic $\nu(C{=}O)$ vibration region (1700-1770 cm$^{-1}$) [64, 65], the $\nu$ (N—H) stretching vibration region (3200-3600 cm$^{-1}$) [66, 67] and the $\delta$(N—H) bending vibration (1590 cm$^{-1}$) [68]. The characteristic peaks for all composites are almost the same. This indicates that the structure of composites is not changed significantly by the presence of WF.

The signal at 1731 cm$^{-1}$ corresponding to $\nu(C{=}O)$ from free urethane shows some differences in the spectra of analyzed aerogels. It can be observed that with increasing concentration of the isocyanate, the carbonyl peak at 1700-1770 cm$^{-1}$ is more intense, as the result of higher cross-linking. We also noticed that the peak of the carbonyl stretching vibration shifted from 1700 to 1710 cm-1 gradually. The shift to a higher wavenumber suggests that the incorporation of WF influences the hydrogen bonding between NH and C=O.

The presence of WF in the PUA system is corroborated by the appearance of a band at 1230 cm$^{-1}$. This signal is associated with the $\nu(C{=}N)$ amide of urethane [69, 70]. The intensity of this signal increases with the concentration of isocyanate.

Worthy of notice is the fact that the peak around 2270 cm$^{-1}$, typical of the stretching vibration of residual isocyanate groups $\nu(—N{=}C{=}O)$ [71], is not observed in any case. This means that WF does not alter the isocyanate index ($R_{NCO/OH}$) defined as the number of moles of NCO groups of the isocyanate per OH mole of the polyol, and that no unreacted isocyanate is left in the composites.

The gelation time is defined as the time required to form a solid gel. As shown in Table 2, the gelation time for the aerogel composites varies from 4 hours to approximately 30 minutes. Gelation time decreases with increasing concentrations of isocyanate. The kinetics of the reaction of isocyanate with hydroxyl groups have been widely studied for the formation of urethane in previous works [72, 73]. The overall process of formation of urethane is first order for isocyanate, water and catalyst concentrations. Thus, with increasing concentrations of isocyanate the rate of formation of PUA increases and gelation time decreases.

TABLE 2

Selected properties of aerogel composites.

| Sample code | Gelation time | Density [g/cm$^3$] | Linear shrinkage (after aging) [%] | Linear shrinkage (after drying) [%] | Surface area [m$^2$/g] | Pore volume [cm$^3$/g] | Pore radius [nm] | Young's Modulus [MPa] |
|---|---|---|---|---|---|---|---|---|
| 1 | 3 hours | 0.40 | 1.3 | 1.7 | 26.8 | 0.082 | 1.79 | 41.6 |
| 2 | 2 hours | 0.42 | 1.5 | 1.2 | 13.5 | 0.027 | 2.13 | 45.3 |
| 3 | 40 min | 0.45 | 2.2 | 0.9 | 10.4 | 0.029 | 5.23 | 49.8 |

FIG. 4 shows the morphology of the aerogel composites by Scanning Electron Microscopy (SEM). Low magnification images (FIGS. 4A, 4C, 4E, respectively) show coarse structures, which correspond to the wood fillers. The fillers have a fuzzy appearance. High magnification images (FIGS. 4B, 4D, 4F, respectively) show that filament-like structures grow out of-, and are connected-to the WF fillers. Structures with comparable morphology were reported by recent work on polyurea aerogels [31]. Thus, we conclude that PUA aerogels cover the surface of the fillers and cross-link them.

Overall, the results obtained in this study are highly interesting, especially taking into account that most previous works involve aerogel composites in which a pre-formed aerogel filler is inlaid in a polymer matrix [74-80], often destroying the microstructure of the aerogels. These results indicate a plethora of application prospects in numerous fields, such as the production of construction materials.

Density measurements of the aerogel composites showed that increasing the concentration of isocyanate increases the density (Table 2). When the isocyanate concentration was increased from 0.2 to 0.5 M density increase from 0.40 to 0.45 g/cm$^3$.

Figure 6A:
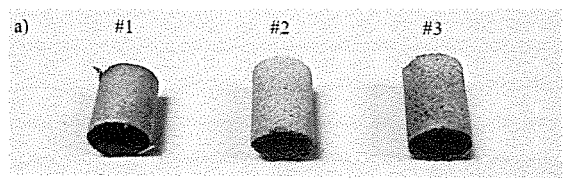
FIGS. 6A and B. Aerogel composites A, before and B, after the freeze drying process.
Figure 6B:
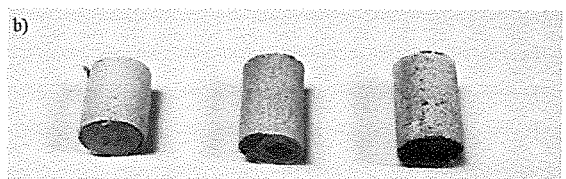
Figure 6C:
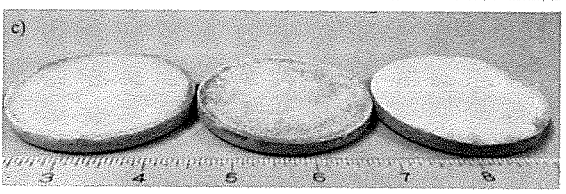

As shown in Table 2, all of the prepared aerogel composites shrank. The shrinkage of samples was measured during aging and freeze-drying process. Shrinkage during aging was between 1.3 and 2.2%. Shrinkage increases with increasing content of isocyanate (FIG. 5A) which is probably due to increasing aerogel content. It is known, in fact, that polymer aerogels shrink due to formation of hydrogen bonds between the polymer strands [31]. Shrinkage can be as high as 50% in the absence of fillers [27,29,81,82]. Freeze drying induced another 0.9-1.7% shrinkage (FIG. 5B). The lower shrinkage of our composites (compared to pure polymeric aerogels) is due to the mechanical reinforcement provided by the fillers. A similar trend was observed by Li et al. [40] who investigated aramid fiber reinforced silica aerogels. In that work, the authors showed that as the fiber content increases, more fibers crowd into the aerogel matrix increasing mechanical strength and decreasing shrinkage. Because of the low shrinkage all composites retain their original shape (FIGS. 6A and 6B), and samples of up to 6 cm in diameter could be produced by freeze drying without noticeable cracking, as shown in FIG. 6C. The absence of cracks is unusual in pure polymeric aerogels, which are difficult to produce in large sizes by freeze drying.

FIG. 7 shows the $N_2$ adsorption-desorption isotherms of the aerogels, which were examined by Brunauer-Emmet-Teller (BET) analysis. The initial region of isotherm curves shows reversible micropore filling ($P/P_0 < 0.1$) followed by mono and multi-layer adsorption in mesopores ($0.1 < P/P_0 < 0.4$). At higher relative pressures, the amount adsorbed rises steeply due to capillary condensation on the surface of mesopores ($P/P_0 \geq 0.5$). According to IUPAC classifications [83-85], the hysteresis loops in all curves and the unrestricted adsorption at higher pressure can be attributed to types IV and II isotherms, respectively, indicating a combination of mesoporous and macroporous structures in the aerogels.

The results of surface area and pore volume measurements are presented in Table 2. BET surface areas of the composites ranged from 10.6 m$^2$/g to 26.8 m$^2$/g while the pore volume ranged from 0.029 to 0.082 cm$^3$/g, depending on the concentration of isocyanate. The pore size distribution of the composites based on their desorption curves by the Barret-Joyner-Helenda (BJH) method are presented in FIG. 8, which shows that isocyanate concentration affects the average pore size and pore size distribution of the resulting materials. With increasing concentrations of isocyanate, the composites show a wider pore size distribution. For more concentrated aerogels, the peak shifted from 1.6 to 2.7 and 5.2 nm for samples #1, #2 and #3, respectively. These trends indicate that with increasing monomer concentration the volume fraction of the aerogel increases, and confirms that the polymer does not merely coat the surface of the fillers but it extends in the space between fillers.

Compression tests were performed on all aerogel formulations in the study and the stress-strain curves are shown in FIG. 9. Independent of the formulation, all composites exhibit three stages of deformation in compression: linear, plateau and densification, similar to other polymeric aerogels [25, 33, 82, 86]. Stress-strain curves of samples with lower concentrations of isocyanate exhibit a sharp transition from the linear to the plateau region. Samples with lower concentration are characterized by a more smooth transition indicating greater ductility of the materials.

The values of Young's modulus (E) obtained from the compression curves are reported in Table 2. The Young's modulus of the samples measured as the initial slope of the stress strain curve ranged from 45.3 to 49.8 MPa. As presented in FIG. 10, under compression, sample #1 (FIG. 10A) shatters into fragments, while samples #2 and #3 (FIGS. 10B and C) develop superficial cracks and only small portions peel off their surfaces. Otherwise they hold together, presumably because most pores have been closed.

Previous studies have shown that the modulus in aerogels depends on density and that lower density typically results in a lower modulus within a family of aerogels [25, 33, 82, 86, 87]. Young's modulus (E) and density (ρ) are related by a power law [88]:

$$E = E_0 (\rho/\rho_0)^m \qquad (3)$$

Best-fit of Eq. (3) to our data yields m=3.5, which is in the same range as many other aerogel composites [31].

Mechanical properties of aerogel composites prepared in this study are exceptional. The enhanced mechanical properties can be attributed to the interactions between PUA chains and the hydroxyl groups of cellulose in with WF. The interactions likely form crosslinking points through chemical bonding, which could overcome the expansive force in the compressive test, improving the mechanical properties of the composites. The special structure of WF, which possess many 'hooks' (reactive hydroxyl groups) dispersed evenly on the fibers, provides an opportunity for the WF fibers to entangle with the PUA aerogel matrix and renders them more difficult to detach from aerogels during compression. The external stress is transferred to the integral WF/aerogels, avoiding filler delamination. Because of this, the aerogel composites would be suitable for use as load-bearing insulation.

Figure 11A:
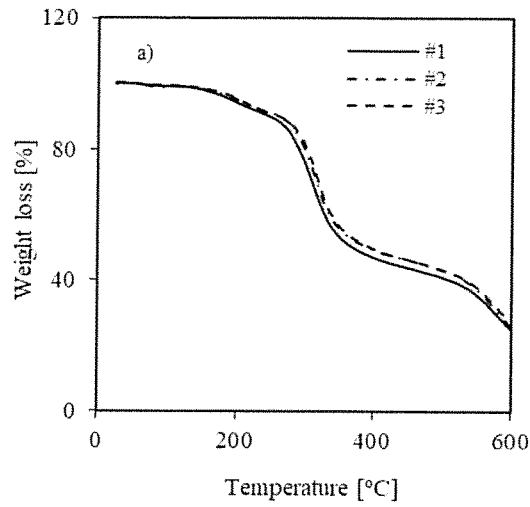
FIGS. 11A and B. A, TGA and B, DTG curves of aerogel composites.
Figure 11B:
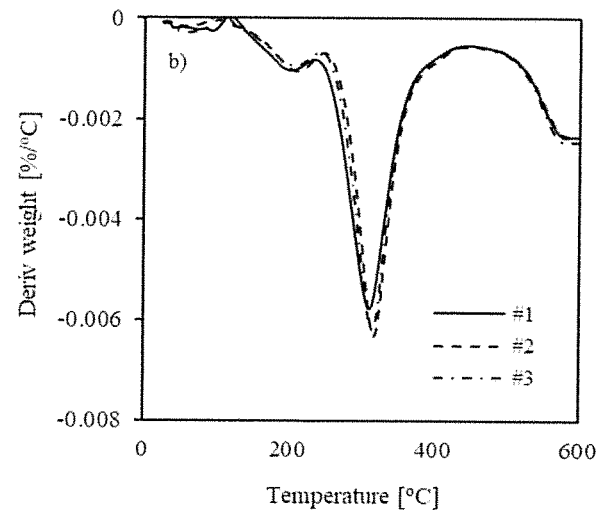

Thermal stability of the aerogel composites was characterized by thermogravimetric analysis (TGA) and derivative thermogravimetry (DTG), as illustrated in FIGS. 11A and B, respectively.

Each of the analyzed samples is characterized by a comparable degradation pattern. The first degradation step occurs at temperatures between about 150 and 330° C. and is due to dissociation of the urethane bond. The second degradation step occurs at temperatures between 330 and 400° C. and is due to the decomposition of soft polyol segments [92]. The third degradation step occurs at temperatures of about 500° C. and is due to degradation of the fragments generated during the second step [90,93].

It should be also pointed out that thermal degradation is also related to the presence of wood particles and their degradation in the polymer matrix. Above 200° C., thermal fragmentation of cellulose begins [63, 94, 95], leading to damage of the cellulose network and increasing the thermal degradation of the resulting material.

Figure 12A:
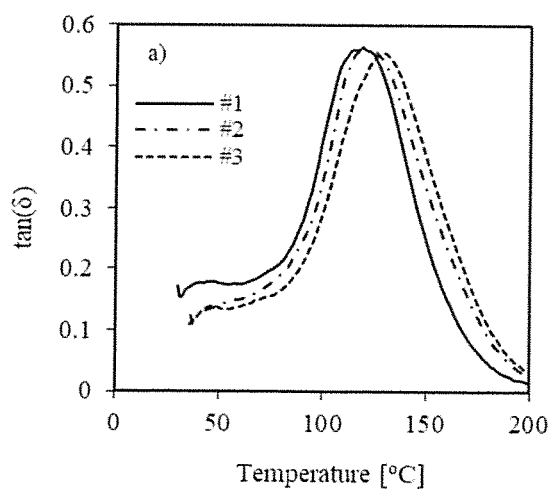
FIGS. 12A and B. A, Tan δ and B, storage modulus as a function of temperature plotted for aerogel composites.

Dynamic mechanical measurements were used to evaluate the viscoelastic properties of the aerogel composites. The glass transition temperature ($T_g$) was determined as the peak maximum of tan δ as a function of temperature. The results, presented in FIG. 12A and Table 3, indicate that more concentrated samples have a higher $T_g$. With increasing concentrations of isocyanate, $T_g$ increases from 120 to 145° C. The shift toward higher temperatures that occurs in the tan δ suggests a strong interaction between the reinforcing filler and the polymer matrix and confirms the conclusions of the compression analysis. The reduced height of the peak after WF addition is due to a dilution-effect. It also indicates that the filler reduces the composite's ability to dissipate mechanical energy, that is, it reduces the damping capability. The increase in $T_g$ is likely a reflection of the increased aromaticity and cross-link density due to the higher amount of isocyanate [96].

TABLE 3

The results of thermogravimetric analysis of aerogel composites.

| Sample codes | $T_{10}$ [° C.] | $T_{50}$ [° C.] | $T_{80}$ [° C.] | $T_g$ [° C.] | Thermal conductivity [W/(mK)] |
|---|---|---|---|---|---|
| #1 | 208 | 307 | 565 | 120 | 0.047 |
| #2 | 210 | 320 | 582 | 128 | 0.050 |
| #3 | 216 | 325 | 576 | 145 | 0.078 |

Figure 12B:
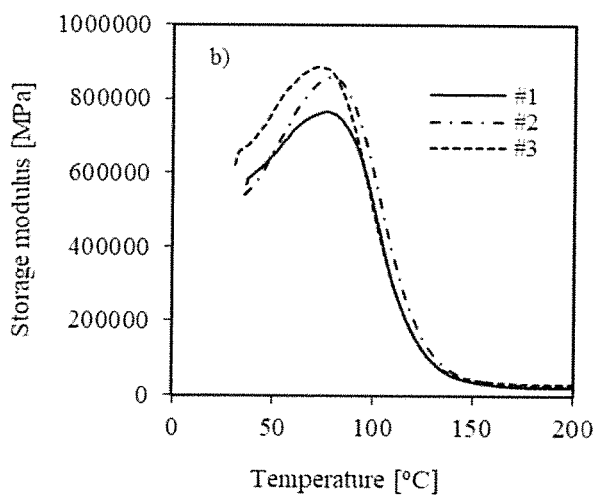

In FIG. 12B, it is notable that more concentrated samples are characterized by a higher storage modulus (E'). This improvement in E' is attributed to the beginning of a thermal transition, which is associated with a hard segment phase. The changes observed around 100° C. are attributable to the presence of a high concentration of hydrogen-bonded aromatic urethane groups in the poly(ether-urethane) phase and hard-segment domains which act as macroscopic cross links. The higher E' for sample #3 indicates more restricted mobility compared to samples #1 and #2; thus, a lower concentration of isocyanate produces more flexible materials. Overall, the composites show a marked improvement in modulus with increasing isocyanate concentration. This improvement is also based on the chemical and hydrogen bonds developed between isocyanate groups and the hydroxyl groups of the wood flour cell walls, as discussed for the large upward shift observed in the $T_g$ of the composites. The filler-matrix bonds act as extra crosslinks at the interfaces of the composite materials, improving the matrix-fiber adhesion, giving more compact structures as well as enhancing the mechanical properties, modulus and stress properties. The E' values are also in agreement with SEM results (FIG. 4), which showed that in more concentrated samples, the primary particles assembled into secondary aggregates, which in turn were shown quantitatively to form higher fractal agglomerates.

One of the most important parameters of aerogels is thermal conductivity, which determines their potential usefulness as insulating materials. As shown in Table 3, the thermal conductivity of samples varied from 0.047 to 0.078 W/mK with varying isocyanate content. The effective thermal conductivity ($\lambda_{eff}$) consists of a radiative ($\lambda_r$), a gaseous ($\lambda_g$) and a solid ($\lambda_s$) contribution [97]. In aerogels, the gaseous conductivity is generally negligible because the mesopores suppress convection. The radiative conductivity is often negligible, being typically on the order of 10% of the total thermal conductivity. Our results indicate that thermal conductivity increases with composite density (FIG. 13). This indicates that conduction through the solid phase is predominant, in line with expectations for aerogels, and especially organic aerogels. We also note that our composites have higher thermal conductivity than pure (i.e., without fillers) organic aerogels, likely due to thermal bridging by the filler.

Apart from thermal and mechanical properties, dimensional stability is another important characteristic of insulating materials. Knowledge about the effects of elevated temperature on the material properties is of practical importance when considering uses of the aerogels. The % linear changes in length and width and thickness after exposure at 70° C. and 70% of humidity for up to 14 days are presented in FIG. 14. In all cases, the variations in a sample's dimensions after treatment are less than 3%, which is the maximum change in linear dimensions allowed by industrial standards.

Figure 15:
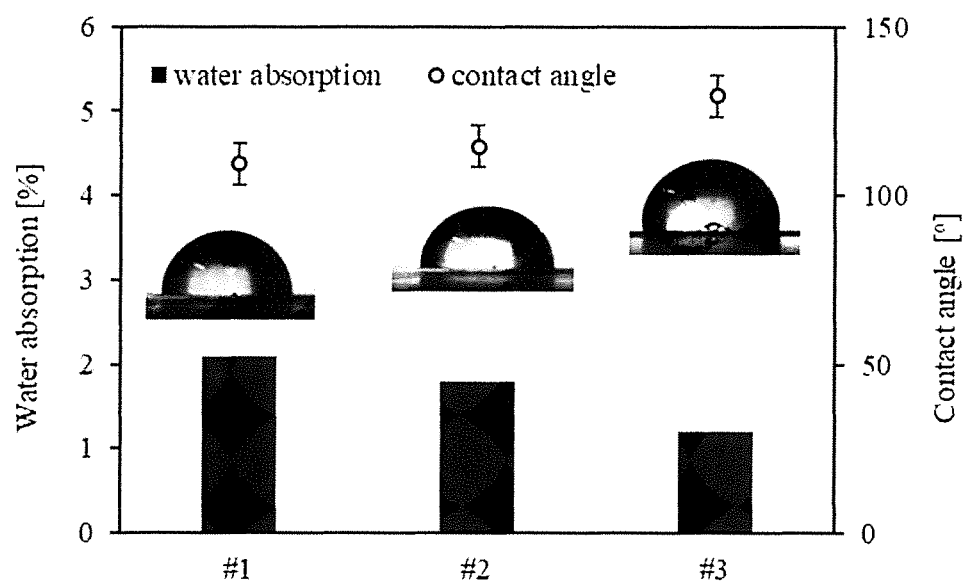
FIG. 15. Effect of contact angle on water absorption of aerogel composites.

For using aerogels for thermal insulation and in the construction industry, the hydrophilic/hydrophobic balance is very important. FIG. 15 shows water absorption profiles of all formulations. All samples remain highly water repellant regardless of the formulation. As typical for hydrophobic materials, water droplets bead up on the sample surface. We also note that the contact angle increases with increasing isocyanate concentration. The higher contact angle likely reflects the more compact morphology of high concentration aerogels, as shown in FIG. 4. The compactness and hydrophobicity of the fillers might also contribute to the hydrophobicity of the materials.

Table 4 summarizes the thermal properties of the aerogel composites obtained in the current study and those of conventional composite materials, such as plywood, particleboard, hardboard, MDF, HDF, oriented strand board OSB and rigid polyurethane foams (RPUFs). It is observed that the measured density of aerogel composites samples (#1, #2 and #3) varies from 400 to 450 kg/m³. Generally, the formulated aerogel materials have a lower density than those of the other materials presented in Table 4, except plywood, which has a comparable density (490 kg/m³). The minimum value of the aerogel composites thermal conductivity (0.047 W/mK) is significantly lower than that of the commercial materials (>0.100 W/mK), except for particleboard. The thermal conductivity of particleboard (0.082 W/mK) was found to be in the range of the aerogel composites; however, the density is almost twice as high as the density of the aerogels.

Thus, the polymeric aerogel composites are good alternatives to replace commercial wood-based materials.

TABLE 4

Mechanical and thermal properties of aerogel composites and similar materials.

| Samples | d [kg/m³] | σ [MPa] | λ [W/mK] |
|---|---|---|---|
| #1 | 400 | 41.60 | 0.047 |
| #2 | 420 | 49.80 | 0.050 |
| #3 | 450 | 45.30 | 0.078 |
| Plywood [99] | 490 | 50.00 | 0.120 |
| Particleboard [99] | 690 | 60.00 | 0.104 |
| Hardboard [99] [100] | 890 | 56.00 | 0.082 |
| Medium Density Fibreboard (MDF) [101] | 830 | 70.00 | 0.120 |
| High Density Fibreboard (HDF) [101] | 785 | 80.00 | 0.113 |

TABLE 4-continued

Mechanical and thermal properties of aerogel composites and similar materials.

| Samples | d [kg/m³] | σ [MPa] | λ [W/mK] |
|---|---|---|---|
| Oriented Strand Board (OSB) [102] [103] | 620 | 75.00 | 0.157 |
| PU foams + 15% wood flour [98] | 36 | 4.20 | 0.048 |
| PU foams + 2 wt % of wheat straw [104] | 50 | 0.30 | 0.032 |
| PU foams + 0.8 wt % of cellulose nanocrystal [59] | 38 | 0.19 | 0.025 |
| PU foams + 16 wt % of cellulose fibers [105] | 37 | 0.17 | 0.023 |
| PU foams + 5% of microcrystalline cellulose [106] | 42 | 0.17 | 0.039 |

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

REFERENCES

1. Daniel C, Giudice S, Guerra G (2009) Syndiotatic Polystyrene Aerogels with B, γ, and ε Crystalline Phases. Chem mater 21:1028-1034. doi: 10.1021/cm802537g
2. Rolison D R, Dunn B (2001) Electrically conductive oxide aerogels: new materials in electrochemistry. J Mater Chem 11:963-980. doi: 10.1039/b007591o
3. Randall J P, Meador M A B, Jana S C (2011) Tailoring mechanical properties of aerogels for aerospace applications. ACS Appl Mater Interfaces 3:613-626. doi: 10.1021/am200007n
4. Lu T, Li Q, Chen W, Yu H (2014) Composite aerogels based on dialdehyde nanocellulose and collagen for potential applications as wound dressing and tissue engineering scaffold. Compos Sci Technol 94:132-138. doi: 10.1016/j.compscitech.2014.01.020
5. Zhang Q, Chen C, Wang M, et al (2011) Facile preparation of highly-dispersed cobalt-silicon mixed oxide nanosphere and its catalytic application in cyclohexane selective oxidation. Nanoscale Res Lett 6:586. doi: 10.1186/1556-276X-6-586
6. Mendoza Zélis P, Fernández Van Raap M B, Socolovsky L M, et al (2012) Magnetic hydrophobic nanocomposites: Silica aerogel/maghemite. Phys B Condens Matter 407:3113-3116. doi: 10.1016/j.physb.2011.12.039
7. Zhao J J, Duan Y Y, Wang X D, et al (2013) Optical and radiative properties of infrared opacifier particles loaded in silica aerogels for high temperature thermal insulation. Int J Therm Sci 70:54-64. doi: 10.1016/j.ijthermalsci.2013.03.020
8. Wang X, Zhang Y, Jiang H, et al (2017) Tert-butyl alcohol used to fabricate nanocellulose aerogels via freeze-drying technology. Mater Res Express 4:0-7. doi: 10.1088/2053-1591/aa72bc
9. Hoepfner S, Ratke L, Milow B (2008) Synthesis and characterisation of nanofibrillar cellulose aerogels. Cellulose 15:121-129. doi: 10.1007/s10570-007-9146-8
10. Fischer F, Rigacci A, Pirard R, et al (2006) Cellulose-based aerogels. Polymer (Guildf) 47:7636-7645. doi: 10.1016/j.polymer.2006.09.004
11. Liebner F, Potthast A, Rosenau T, et al (2008) Cellulose aerogels: Highly porous, ultra-lightweight materials. Holzforschung 62:129-135. doi: 10.1515/HF.2008.051
12. Nemoto J, Saito T, Isogai A (2015) Simple Freeze-Drying Procedure for Producing Nanocellulose Aerogel-Containing, High-Performance Air Filters. ACS Appl Mater Interfaces 7:19809-19815. doi: 10.1021/acsami.5b05841
13. Teng J, Yang B, Zhang L Q, et al (2018) Ultra-high mechanical properties of porous composites based on regenerated cellulose and cross-linked poly(ethylene glycol). Carbohydr Polym 179:244-251. doi: 10.1016/j.carbpol.2017.09.090
14. Danial W H, Abdul Majid Z, Mohd Muhid M N, et al (2015) Preparation of Cellulose Nanocrystal Aerogel from Wastepaper through Freeze-Drying Technique. Adv Mater Res 1125:296-300. doi: 10.4028/www.scientific.net/AMR.1125.296
15. Shi J, Lu L, Guo W, et al (2015) On preparation, structure and performance of high porosity bulk cellulose aerogel. Plast Rubber Compos 44:26-32. doi: 10.1179/1743289814Y.0000000107
16. Innerlohinger J, Weber H K, Kraft G (2006) Aerocellulose: Aerogels and aerogel-like materials made from cellulose. Macromol Symp 244:126-135. doi: 10.1002/masy.200651212
17. Tan C, Fung B M, Newman J K, Vu C (2001) Organic aerogels with very high impact strength. Adv Mater 13:644-646. doi: 10.1002/1521-4095(200105)13:9<644::AID-ADMA644>3.0.CO;2-#
18. Elmanovich I V., Pryakhina T A, Vasil'ev V G, et al (2018) A study of the hydrosilylation approach to a one-pot synthesis of silicone aerogels in supercritical C02. J Supercrit Fluids 133:512-518. doi: 10.1016/j.supflu.2017.11.017
19. Zou F, Peng L, Fu W, et al (2015) Flexible superhydrophobic polysiloxane aerogels for oil-water separation via one-pot synthesis in supercritical CO 2. RSC Adv 5:76346-76351. doi: 10.1039/C5RA13023A
20. Sorarh G D, Dalcanale F, Campostrini R, et al (2012) Novel polysiloxane and polycarbosilane aerogels via hydrosilylation of preceramic polymers. J Mater Chem 22:7676. doi: 10.1039/c2jm00020b
21. Bang A, Buback C, Sotiriou-Leventis C, Leventis N (2014) Flexible aerogels from hyperbranched polyurethanes: Probing the role of molecular rigidity with poly(Urethane Acrylates) versus poly(Urethane Norbornenes). Chem Mater 26:6979-6993. doi: 10.1021/cm5031443
22. Chidambareswarapattar C, McCarver P M, Luo H, et al (2013) Fractal multiscale nanoporous polyurethanes: Flexible to extremely rigid aerogels from multifunctional small molecules. Chem Mater 25:3205-3224. doi: 10.1021/cm401623h
23. Chen H B, Liu B, Huang W, et al (2014) Fabrication and properties of irradiation-cross-linked poly(vinyl alcohol)/clay aerogel composites. ACS Appl Mater Interfaces 6:16227-16236. doi: 10.1021/am504418w
24. Chen H B, Hollinger E, Wang Y Z, Schiraldi D A (2014) Facile fabrication of poly(vinyl alcohol) gels and derivative aerogels. Polym (United Kingdom) 55:380-384. doi: 10.1016/j.polymer.2013.07.078
25. Leventis N, Chidambareswarapattar C, Mohite D P, et al (2011) Multifunctional porous aramids (aerogels) by efficient reaction of carboxylic acids and isocyanates. J Mater Chem 21:11981. doi: 10.1039/c1jm11472g
26. Mahadik-Khanolkar S, Donthula S, Sotiriou-Leventis C, Leventis N (2014) Polybenzoxazine aerogels. 1. High- 27. Meador M A B, Malow E J, Silva R, et al (2012) Mechanically strong, flexible polyimide aerogels cross-linked with aromatic triamine. ACS Appl Mater Interfaces 4:536-544. doi: 10.1021/am2014635
28. Guo H, Meador M A B, McCorkle L, et al (2011) Polyimide aerogels cross-linked through amine functionalized polyoligomeric silsesquioxane. ACS Appl Mater Interfaces 3:546-552. doi: 10.1021/am101123h
29. Guo H, Meador M A B, McCorkle L, et al (2012) Tailoring properties of cross-linked polyimide aerogels for better moisture resistance, flexibility, and strength. ACS Appl Mater Interfaces 4:5422-5429. doi: 10.1021/am301347a
30. Meador M A B, McMillon E, Sandberg A, et al (2014) Dielectric and other properties of polyimide aerogels containing fluorinated blocks. ACS Appl Mater Interfaces 6:6062-6068. doi: 10.1021/am405106h
31. Leventis N, Sotiriou-Leventis C, Chandrasekaran N, et al (2010) Multifunctional polyurea aerogels from isocyanates and water. A structure-property case study. Chem Mater 22:6692-6710. doi: 10.1021/cm102891d
32. Ding B, Cai J, Huang J, et al (2012) Facile preparation of robust and biocompatible chitin aerogels. J Mater Chem 22:5801. doi: 10.1039/c2jm16032c
33. Yang J, Li S, Yan L, et al (2010) Compressive behaviors and morphological changes of resorcinol-formaldehyde aerogel at high strain rates. Microporous Mesoporous Mater 133:134-140. doi: 10.1016/j.micromeso.2010.04.025
34. Chen H B, Chiou B Sen, Wang Y Z, Schiraldi D A (2013) Biodegradable pectin/clay aerogels. ACS Appl Mater Interfaces 5:1715-1721. doi: 10.1021/am3028603
35. Pojanavaraphan T, Magaraphan R, Chiou B Sen, Schiraldi D A (2010) Development of biodegradable foamlike materials based on casein and sodium montmorillonite clay. Biomacromolecules 11:2640-2646. doi: 10.1021/bm100615a
36. Blomfeldt T O J, Kuktaite R, Johansson E, Hedenqvist M S (2011) Mechanical properties and network structure of wheat gluten foams. Biomacromolecules 12:1707-1715. doi: 10.1021/bm200067f
37. Donius A E, Liu A, Berglund L A, Wegst U G K (2014) Superior mechanical performance of highly porous, anisotropic nanocellulose-montmorillonite aerogels prepared by freeze casting. J Mech Behav Biomed Mater 37:88-99. doi: 10.1016/j.jmbbm.2014.05.012
38. Realinho V, Haurie L, Antunes M, Velasco J I (2014) Thermal stability and fire behaviour of flame retardant high density rigid foams based on hydromagnesite-filled polypropylene composites. Compos Part B Eng 58:553-558. doi: 10.1016/j.compositesb.2013.11.015
39. Sun M, Sun H, Hostler S, Schiraldi D A (2018) Effects of feather-fiber reinforcement on poly(vinyl alcohol)/clay aerogels: Structure, property and applications. Polym (United Kingdom) 137:201-208. doi: 10.1016/j.polymer.2018.01.008
40. Li Z, Cheng X, He S, et al (2016) Aramid fibers reinforced silica aerogel composites with low thermal conductivity and improved mechanical performance. Compos Part A Appl Sci Manuf 84:316-325. doi: 10.1016/j.compositesa.2016.02.014
41. Feng J, Zhang C, Feng J (2012) Carbon fiber reinforced carbon aerogel composites for thermal insulation prepared by soft reinforcement. Mater Lett 67:266-268. doi: 10.1016/j.matlet.2011.09.076
42. Wan C, Li J (2016) Incorporation of graphene nanosheets into cellulose aerogels: enhanced mechanical, thermal, and oil adsorption properties. Appl Phys A Mater Sci Process 122:1-7. doi: 10.1007/s00339-016-9641-6
43. Fan W, Zuo L, Zhang Y, et al (2018) Mechanically strong polyimide/carbon nanotube composite aerogels with controllable porous structure. Compos Sci Technol 156:186-191. doi: 10.1016/j.compscitech.2017.12.034
44. Bouza R, Marco C, Ellis G, et al (2008) ANALYSIS OF THE ISOTHERMAL CRYSTALLIZATION OF POLYPROPYLENE/WOOD FLOUR COMPOSITES. J Therm Anal Calorim 94:119-127
45. Azizi Samir M A S, Alloin F, Dufresne A (2005) Review of recent research into cellulosic whiskers, their properties and their application in nanocomposite field. Biomacromolecules 6:612-626. doi: 10.1021/bm0493685
46. Quirino R L, Woodford J, Larock R C (2012) Soybean and Linseed Oil-Based Composites Reinforced with Wood Flour and Wood Fibers. J Appl Polym Sci 124:1520-1528. doi: 10.1002/app
47. Mosiewicki M A, Casado U, Marcovich N E, Aranguren M I (2008) Vegetable oil based-polymers reinforced with wood flour. Mol Cryst Liq Cryst 484:509-516. doi: Doi 10.1080/15421400801904344
48. Habibi Y, Lucia L A, Rojas O J (2010) Cellulose Nanocrystals: Chemistry, Self-Assembly, and Applications. d:3479-3500
49. ASTM D2842—Standard Test Method for Water Absorption of Rigid Cellular Plastics
50. ISO 2896—Rigid cellular plastics—Determination of water absorption
51. Gao Z H, Gu J Y, Wang X, et al (2005) FTIR and XPS study of the reaction of phenyl isocyanate and cellulose with different moisture contents. Pigment Resin Technol 34:282-289. doi: 10.1108/03699420510620300
52. Leng W, Li J, Cai Z (2017) Synthesis and characterization of cellulose nanofibril-reinforced polyurethane foam. Polymers (Basel) 9. doi: 10.3390/polym9110597
53. Kumari S, Chauhan G S, Ahn J H (2016) Novel cellulose nanowhiskers-based polyurethane foam for rapid and persistent removal of methylene blue from its aqueous solutions. Chem Eng J 304:728-736. doi: 10.1016/j.cej.2016.07.008
54. Rueda L, Fernindez d'Arlas B, Zhou Q, et al (2011) Isocyanate-rich cellulose nanocrystals and their selective insertion in elastomeric polyurethane. Compos Sci Technol 71:1953-1960. doi: 10.1016/j.compscitech.2011.09.014
55. Sannino A, Demitri C, Madaghiele M (2009) Biodegradable cellulose-based hydrogels: Design and applications. Materials (Basel). 2:353-373
56. Luo F, Wu K, Guo H, et al (2015) Effect of cellulose whisker and ammonium polyphosphate on thermal properties and flammability performance of rigid polyurethane foam. J Therm Anal Calorim 122:717-723. doi: 10.1007/s10973-015-4766-y
57. Rueda L, Saralegui A, Fernindez D'Arlas B, et al (2013) Cellulose nanocrystals/polyurethane nanocomposites. Study from the viewpoint of microphase separated structure. Carbohydr Polym 92:751-757. doi: 10.1016/j.carbpol.2012.09.093
58. Marcovich N E, Auad M L, Bellesi N E, et al (2006) Cellulose micro/nanocrystals reinforced polyurethane. J Mater Res 21:870-881. doi: 10.1557/jmr.2006.0105

59. Septevani A A, Evans D A C, Annamalai P K, Martin D J (2017) The use of cellulose nanocrystals to enhance the thermal insulation properties and sustainability of rigid polyurethane foam. Ind Crops Prod 107:114-121. doi: 10.1016/j.indcrop.2017.05.039
60. Mráz J, Šimek P, Chvalová D, et al (2004) Studies on the methyl isocyanate adducts with globin. Chem Biol Interact 148:1-10. doi: 10.1016/j.cbi.2003.06.003
61. Schwetlick K, Noack R, Stebner F (1994) Three Fundamental Mechanisms of Base-catalysed Reactions of lsocyanates with Hydrogen-acidic Compounds. J Chem Soc Perkin Trans 2 599-608
62. Arnold R G, Nelson J A, Verbanc J J (1957) Recent Advances in Isocyanate Chemistry. Chem Rev 57:47-76. doi: 10.1021/cr50013a002
63. Guo C, Zhou L, Lv J (2013) Effects of expandable graphite and modified ammonium polyphosphate on the flame-retardant and mechanical properties of wood flour-polypropylene composites. Polym Polym Compos 21:449-456. doi: 10.1002/app
64. Matsumura S, Hlil A R, Lepiller C, et al (2008) Ionomers for proton exchange membrane fuel cells with sulfonic acid groups on the end-groups: Novel branched poly (ether-ketone)s. Am Chem Soc Polym Prepr Div Polym Chem 49:511-512. doi: 10.1002/pola
65. Hatchett D W, Kodippili G, Kinyanjui J M, et al (2005) FTIR analysis of thermally processed PU foam. Polym Degrad Stab 87:555-561. doi: 10.1016/j.polymdegradstab.2004.10.012
66. Chuayjuljit S, Sangpakdee T (2007) Processing and Properties of Palm Oil-Based Rigid Polyurethane Foam. J Met Mater Miner 17:17-23
67. Hu Y H, Gao Y, De Wang N, et al (2002) Rigid polyurethane foam prepared from a rape seed oil based polyol. J Appl Polym Sci 84:591-597. doi: 10.1002/app.10311
68. Stirna U, Beverte I, Yakushin V, Cabulis U (2011) Mechanical properties of rigid polyurethane foams at room and cryogenic temperatures. J Cell Plast 47:337-355. doi: 10.1177/0021955X11398381
69. Jacob C R, Luber S, Reiher M, et al (2009) Analysis of Secondary Structure Effects on the IR and Raman Spectra of Polypeptides in Terms of Localized Vibrations Analysis of Secondary Structure Effects on the IR and Raman Spectra of Polypeptides in Terms of Localized Vibrations. 6558-6573. doi: 10.1021/jp900354g
70. Zhang S, Ren Z, He S, et al (2007) FTIR spectroscopic characterization of polyurethane-urea model hard segments (PUUMHS) based on three diamine chain extenders. Spectrochim Acta—Part A Mol Biomol Spectrosc 66:188-193. doi: 10.1016/j.saa.2006.02.041
71. Fernandez B, Rueda L, Stefani P, et al (2007) Kinetic and thermodynamic studies of the formation of a polyurethane based on 1,6-hexamethylene diisocyanate and poly(carbonate-co-ester)diol. Thermochim Acta 459:94-103. doi: 10.1016/j.tca.2007.03.021
72. Borsus J, Jerome R, Teyssie P (1981) Catalysis of the reaction between isocyanates and protonic substrates. I. Metal salt-amine complexes as catalysts in the polyurea foaming process. J Appl Polym Sci 26:3027-3043. doi: 10.1002/app.1981.070260918
73. Farkas A, Mills G (1962) Catalytic Effects in Isocyanate Reactions. Adv Catal 13:393-446. doi: 10.1016/S0360-0564(08)60290-4
74. Li X, Wang Q, Li H, et al (2013) Effect of sepiolite fiber on the structure and properties of the sepiolite/silica aerogel composite. J Sol-Gel Sci Technol 67:646-653. doi: 10.1007/s10971-013-3124-4
75. Finlay K, Gawryla M D, Schiraldi D A (2008) Biologically based fiber-reinforced/clay aerogel composites. Ind Eng Chem Res 47:615-619. doi: 10.1021/ie0705406
76. Finlay K A, Gawryla M D, Schiraldi D A (2015) Effects of fiber reinforcement on clay aerogel composites. Materials (Basel) 8:5440-5451. doi: 10.3390/ma8085258
77. Li Z, Gong L, Li C, et al (2016) Silica aerogel/aramid pulp composites with improved mechanical and thermal properties. J Non Cryst Solids 454:1-7. doi: 10.1016/j.jnoncrysol.2016.10.015
78. Tang X, Sun A, Chu C, et al (2017) A novel silica nanowire-silica composite aerogels dried at ambient pressure. Mater Des 115:415-421. doi: 10.1016/j.matdes.2016.11.080
79. Li C, Cheng X, Li Z, et al (2017) Mechanical, thermal and flammability properties of glass fiber film/silica aerogel composites. J Non Cryst Solids 457:52-59. doi: 10.1016/j.jnoncrysol.2016.11.017
80. Li Z, Gong L, Cheng X, et al (2016) Flexible silica aerogel composites strengthened with aramid fibers and their thermal behavior. Mater Des 99:349-355. doi: 10.1016/j.matdes.2016.03.063
81. Pei X, Zhai W, Zheng W (2014) Preparation and characterization of highly cross-linked polyimide aerogels based on polyimide containing trimethoxysilane side groups. Langmuir 30:13375-13383. doi: 10.1021/la5026735
82. Chidambareswarapattar C, Larimore Z, Sotiriou-Leventis C, et al (2010) One-step room-temperature synthesis of fibrous polyimide aerogels from anhydrides and isocyanates and conversion to isomorphic carbons. J Mater Chem 20:9666. doi: 10.1039/c0jm01844a
83. Kruk M, Jaroniec M (2001) Gas Adsorption Characterization of Ordered Organic-Inorganic Nanocomposite Materials. doi: 10.1021/CM0101069
84. Sing K S W (1985) Reporting physisorption data for gas/solid systems with special reference to the determination of surface area and porosity (Recommendations 1984). Pure Appl Chem 57:603-619. doi: 10.1351/pac198557040603
85. Yun S, Luo H, Gao Y (2015) Low-density, hydrophobic, highly flexible ambient-pressure-dried monolithic bridged silsesquioxane aerogels. J Mater Chem A 3:3390-3398. doi: 10.1039/C4TA05271D
86. Leventis N, Sotiriou-Leventis C, Mohite D P, et al (2011) Polyimide aerogels by ring-opening metathesis polymerization (ROMP). Chem Mater 23:2250-2261. doi: 10.1021/cm200323e
87. Guo H, Meador M A B, McCorkle L, et al (2011) Polyimide Aerogels Cross-Linked through Amine Functionalized Polyoligomeric Silsesquioxane. ACS Appl Mater Interfaces 3:546-552. doi: 10.1021/am101123h
88. Gross J, Fricke J (1995) Scaling of elastic properties in highly porous nanostructured aerogels. Nanostructured Mater 6:905-908
89. Wong J C H, Kaymak H, Brunner S, Koebel M M (2014) Mechanical properties of monolithic silica aerogels made from polyethoxydisiloxanes. Microporous Mesoporous Mater 183:23-29. doi: 10.1016/j.micromeso.2013.08.029
90. Jiao L, Xiao H, Wang Q, Sun J (2013) Thermal degradation characteristics of rigid polyurethane foam and the volatile products analysis with TG-FTIR-MS. Polym Degrad Stab 98:2687-2696. doi: 10.1016/j.polymdegradstab.2013.09.032

91. Levchik S V., Weil E D (2004) Thermal decomposition, combustion and fire-retardancy of polyurethanes—A review of the recent literature. Polym Int 53:1585-1610. doi: 10.1002/pi.1314
92. Septevani A A, Evans D A C, Chaleat C, et al (2015) A systematic study substituting polyether polyol with palm kernel oil based polyester polyol in rigid polyurethane foam. Ind Crops Prod 66:16-26. doi: 10.1016/j.indcrop.2014.11.053
93. Chattopadhyay D K, Webster D C (2009) Thermal stability and flame retardancy of polyurethanes. Prog Polym Sci 34:1068-1133. doi: 10.1016/j.progpolymsci.2009.06.002
94. Pommet M, Morel M H, Redl A, Guilbert S (2004) Aggregation and degradation of plasticized wheat gluten during thermo-mechanical treatments, as monitored by rheological and biochemical changes. Polymer (Guildf) 45:6853-6860. doi: 10.1016/j.polymer.2004.07.076
95. Newson W R, Rasheed F, Kuktaite R, et al (2015) Commercial potato protein concentrate as a novel source for thermoformed bio-based plastic films with unusual polymerisation and tensile properties. RSC Adv 5:32217-32226. doi: 10.1039/C5RA00662G
96. Wu L, Gemert J V, Camargo R E (2008) Rheology Study in Polyurethane Rigid Foams. Auburn Hills, USA
97. Estravís S, Tirado-Mediavilla J, Santiago-Calvo M, et al (2016) Rigid polyurethane foams with infused nanoclays: Relationship between cellular structure and thermal conductivity. Eur Polym J 80:1-15. doi: 10.1016/j.eurpolymj.2016.04.026
98. Mosiewicki M A, Dell'Arciprete G A, Aranguren M I, Marcovich N E (2009) Polyurethane foams obtained from castor oil-based polyol and filled with wood flour. J Compos Mater 43:3057-3072. doi: 10.1177/0021998309345342
99. Dent C E, Stepka W, Steward F C (1947) Detection of the free amino-acids of plant cells by partition chromatography. Nature 160:682-683. doi: 10.1038/160682a0
100. Mcnatt J D, Myers G (1993) Selected properties of commercial high-density hardboards
101. Sonderegger W, Niemz P (2009) Thermal conductivity and water vapour transmission properties of wood-based materials. Eur J Wood Wood Prod 67:313-321. doi: 10.1007/s00107-008-0304-y
102. Strandboard O (2016) The Investigation of Thermal Conductivity of Waste Polyethylene in Journal of Selçuk University Natural and Applied Science The Investigation of Thermal Conductivity of Waste Polyethylene in Manufacture of Oriented Strandboard.
103. Steidl C M, Wang S, Richard, et al Tensile and compression properties through the thickness of oriented strandboard
104. Paberza A, Cabulis U, Arshanitsa A (2014) Wheat straw lignin as filler for rigid polyurethane foams on the basis of tall oil amide. Polimery/Polymers 59:477-481. doi: 10.14314/polimery.2014.477
105. Silva M C, Takahashi J A, Chaussy D, et al (2010) Composites of rigid polyurethane foam and cellulose fiber residue. J Appl Polym Sci n/a-n/a. doi: 10.1002/app.32281
106. Qi X, Zhang Y, Chang C, et al (2018) Thermal, Mechanical, and Morphological Properties of Rigid Crude Glycerol-Based Polyurethane Foams Reinforced With Nanoclay and Microcrystalline Cellulose. Eur J Lipid Sci Technol 120:1700413

We claim:

1. A method of forming a polymeric aerogel, comprising:
   forming a mixture from at least one monomer, an organic solvent, and a filler comprising hydroxyl groups;
   forming a gel by
      polymerizing the at least one monomer in the mixture, thereby forming polymer chains, and
      cross-linking the polymer chains to the hydroxyl groups of the filler comprising hydroxyl groups;
   aging the gel in a mold or extrusion vessel;
   removing or extruding the gel from the mold or extrusion vessel; and
   drying the gel to form the aerogel;
   wherein the at least one monomer is an isocyanate monomer or a phenolic monomer.

2. The method of claim 1 wherein drying is performed at ambient temperature and ambient pressure.

3. The method of claim 1, wherein the filler comprising hydroxyl groups fillers is wood flour.

4. The method of claim 1 further comprising printing the gel with a three-dimensional printing apparatus prior to said drying step.

5. The method of claim 1, wherein the step of forming a gel is performed at a temperature of from 20-40° C.

* * * * *